(12) United States Patent
Schwartz

(10) Patent No.: US 11,256,833 B2
(45) Date of Patent: Feb. 22, 2022

(54) SYSTEM FOR ON-SITE TRACKING, MANAGING, PLANNING AND STAGING CONSTRUCTION PROJECTS

(71) Applicant: NUCOR CORPORATION, Charlotte, NC (US)

(72) Inventor: Timothy Michael Schwartz, Auburn, IN (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

(21) Appl. No.: 15/969,146

(22) Filed: May 2, 2018

(65) Prior Publication Data
US 2018/0322225 A1 Nov. 8, 2018

Related U.S. Application Data

(60) Provisional application No. 62/502,309, filed on May 5, 2017.

(51) Int. Cl.
*G06F 17/00* (2019.01)
*G06F 30/13* (2020.01)
(Continued)

(52) U.S. Cl.
CPC ............ *G06F 30/13* (2020.01); *G06F 3/0482* (2013.01); *G06F 3/04842* (2013.01);
(Continued)

(58) Field of Classification Search
CPC ...... G06Q 10/06; G06Q 50/08; G06Q 10/083; G06F 3/0482; G06F 30/13; G06K 7/1413
(Continued)

(56) References Cited

U.S. PATENT DOCUMENTS 7,062,532 B1   6/2006 Sweat et al.
7,720,703 B1   5/2010 Broughton
(Continued)

OTHER PUBLICATIONS

Beveridge, 'Best Practices Using Building Information Modeling in Commercial Construction', BYU Scholars Archive, 2012 (Year: 2012).*

(Continued)

*Primary Examiner* — Stephen S Hong
*Assistant Examiner* — Matthew J Ludwig
(74) *Attorney, Agent, or Firm* — Moore & Van Allen PLLC; Jeffrey R. Gray

(57) ABSTRACT

A construction management system allows a user to capture an item identifier from an item (e.g., shipment, group of components, and/or one or more components) using a mobile device. The item identifier may be used to identify a project and access a model for the product, identify a component in a model, and/or identify the components in a shipment for staging purposes. Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

20 Claims, 11 Drawing Sheets

(51) Int. Cl.
   *G06Q 10/08* (2012.01)
   *G06F 3/0482* (2013.01)
   *G06F 3/04842* (2022.01)
   *G06K 7/14* (2006.01)
   *G06T 19/00* (2011.01)
   *G06F 3/04815* (2022.01)
   *G06F 111/20* (2020.01)

(52) U.S. Cl.
   CPC ......... *G06K 7/1413* (2013.01); *G06Q 10/083* (2013.01); *G06T 19/00* (2013.01); *G06F 3/04815* (2013.01); *G06F 2111/20* (2020.01); *G06T 2219/004* (2013.01)

(58) Field of Classification Search
   USPC ........................................ 715/763, 764, 825
   See application file for complete search history.

(56) References Cited

U.S. PATENT DOCUMENTS

| | | | | |
|---|---|---|---|---|
| 7,917,409 | B1* | 3/2011 | Whiteley | G06Q 10/087 705/28 |
| 8,121,874 | B1* | 2/2012 | Guheen | G06Q 10/087 705/7.11 |
| 8,249,909 | B2 | 8/2012 | Watanabe et al. | |
| 8,514,058 | B2 | 8/2013 | Cameron | |
| 8,732,125 | B2 | 5/2014 | Omansky et al. | |
| 8,830,239 | B2* | 9/2014 | Saleem | G06Q 10/00 345/440 |
| 8,843,350 | B2 | 9/2014 | Jacobi et al. | |
| 8,887,993 | B2 | 11/2014 | Floyd et al. | |
| 9,031,585 | B2 | 5/2015 | Kahle et al. | |
| 9,098,593 | B2 | 8/2015 | Floyd et al. | |
| 9,396,454 | B2 | 7/2016 | Dearing et al. | |
| 9,424,371 | B2 | 8/2016 | Shear et al. | |
| 9,438,754 | B2* | 9/2016 | Schoner | G06F 16/50 |
| 9,510,150 | B2 | 11/2016 | Kahle et al. | |
| 9,817,839 | B2* | 11/2017 | Kahle | G06Q 10/06 |
| 9,875,458 | B2 | 1/2018 | Iyer | |
| 10,997,378 | B2 | 5/2021 | Uchimura | |
| 2004/0024644 | A1* | 2/2004 | Gui | G06Q 10/087 705/22 |
| 2005/0131658 | A1 | 6/2005 | Mei et al. | |
| 2006/0085664 | A1* | 4/2006 | Nakamura | G06F 11/008 714/1 |
| 2007/0013690 | A1* | 1/2007 | Grimaud | G06T 19/00 345/419 |
| 2011/0246155 | A1 | 10/2011 | Fitch et al. | |
| 2011/0276886 | A1* | 11/2011 | Hall | G06Q 10/06 715/734 |
| 2011/0307281 | A1 | 12/2011 | Creveling et al. | |
| 2012/0030067 | A1* | 2/2012 | Pothukuchi | G06Q 10/087 705/26.81 |
| 2012/0116728 | A1 | 5/2012 | Shear et al. | |
| 2012/0310602 | A1* | 12/2012 | Jacobi | G06F 30/13 703/1 |
| 2013/0314210 | A1 | 11/2013 | Schoner et al. | |
| 2013/0325410 | A1 | 12/2013 | Jung et al. | |
| 2014/0006074 | A1* | 1/2014 | Cockburn | E02F 9/2054 705/7.11 |
| 2014/0278267 | A1* | 9/2014 | Buzz | G06F 30/13 703/1 |
| 2014/0316837 | A1 | 10/2014 | Fosburgh et al. | |
| 2014/0365259 | A1* | 12/2014 | Delplace | G06Q 10/063114 705/7.15 |
| 2015/0169791 | A1 | 6/2015 | Lavrov et al. | |
| 2016/0034730 | A1 | 2/2016 | Delplace | |
| 2016/0071258 | A1* | 3/2016 | McClung, III | G06Q 30/0278 705/4 |
| 2016/0117785 | A1 | 4/2016 | Lerick et al. | |
| 2016/0189089 | A1* | 6/2016 | Iyer | G06Q 10/087 705/28 |
| 2016/0225097 | A1* | 8/2016 | Cooper | G06Q 40/08 |
| 2016/0335731 | A1* | 11/2016 | Hall | G06Q 50/163 |
| 2018/0121571 | A1* | 5/2018 | Tiwari | G08B 19/00 |
| 2018/0239313 | A1* | 8/2018 | Santarone | G01S 19/071 |
| 2018/0321799 | A1 | 11/2018 | Schwartz | |
| 2018/0322225 | A1 | 11/2018 | Schwartz | |

OTHER PUBLICATIONS

Valero, Evolution of RFID Applications in Construction: A literature Review, Sensors 2015, Open Access Sensors, 2015.

Brucker, Ermerging Challenges and Opportunities in Building Information Modeling for the US Army Installation Management Command, Center for the Advancement of Sustainability Innovations (CASI), 2012.

Weisheng Lu, Scenarios for applying RFID technology in construction project management, Automation in Construction, 2010.

* cited by examiner

SYSTEM FOR ON-SITE TRACKING, MANAGING, PLANNING AND STAGING CONSTRUCTION PROJECTS

CLAIM OF PRIORITY UNDER 35 U.S.C. § 119

The present Application for a patent claims priority to U.S. Provisional Patent Application Ser. No. 62/502,309 entitled "System for On-Site Tracking, Managing, Planning, and Staging Construction Projects" filed on May 5, 2017 and assigned to the assignees hereof and hereby expressly incorporated by reference herein.

FIELD

In general, embodiments of the invention relate to tracking, managing, planning, and staging of construction projects, and more particularly a system permitting users to track, manage, plan, and stage construction projects on-site through the use of an on-site system.

BACKGROUND

Construction projects are typically managed on-site using paper drawings, delivery orders, or the like. However, there is a need for improved applications and systems that can provide improved tracking, managing, planning, and staging for construction projects.

BRIEF SUMMARY OF THE INVENTION

The following presents a simplified summary of one or more embodiments of the invention in order to provide a basic understanding of such embodiments. This summary is not an extensive overview of all embodiments, and it is intended to neither identify key or critical elements of all embodiments, nor delineate the scope of any or all embodiments. The summary's sole purpose is to present some concepts of one or more embodiments in a simplified form as a prelude to the more detailed description that is presented later.

Embodiments of the invention relate to systems, computer implemented methods, and computer program products for a construction management application. The construction management application allows a customer user using a user computer system, such as a mobile device, to receive a model of a project on a construction site. The model is interactive and allows the user to perform a number of functions using various interfaces.

One function of the construction management application allows a customer user to capture an item identifier from an item using a mobile device, such as when an item arrives on-site or at a later point in time. The identifier may be a barcode, or other like item that may be used to identify a project associated with the item. The item may be a delivery vehicle, one or more packages (e.g., groups of components bundled together, or the like), or one or more components (e.g., separate components not bundled together). The identifier may be used to identify project information related to the identifier. Once the project is identified the user computer system may retrieve a model for the project (e.g., model stored locally or retrieved from an entity computer system). The model can display the one or more components associated with the item (e.g., highlighting the one or more components in the model, or the like). Alternatively, the user may also physically type an identifier into the user computer system to access a model and/or view the components in the model.

Additionally, the user may select one or more components in the model (e.g., using a touch screen to select components in the model and/or from a component list) and the construction management application provides a status for the one or more components. The status may be that the one or more components are shipped, received, staged for assembly, installed, or the like as will be described in further detail herein. The status of the one or more components may be automatically updated or manually updated by the user using the construction management application.

Moreover, the user may also select shipment information for past, current, and/or future shipments in order to identify the one or more components associated with each of the shipments. Alternatively, the user may select one or more components from the model in order to determine the shipping information associated with the one or more components, such as when the component is scheduled for shipment.

Additional features of the invention allow a user to select two more components from the model. In response the construction management application provides component information for the two or more components, as well as aggregated component information. For example, the user may capture the aggregated weight of the two or more components in order to determine if the project assets would allow for assembly of the two or more components before installation in the building (e.g., the site has a crane that could lift the assembled components based on weight and dimensions).

The invention also allows the user to change the status of a component to indicate that the component is damaged. The information regarding the damaged component may be sent to the entity to allow the entity to replace the damaged component.

The user may also capture item information from one or more components on-site or from one or more components that have been delivered in order to determine the components located in a staged location (e.g., if all the components are in the staged location) or where components should be delivered for staging (e.g., where to locate a shipment). The location of the components may be illustrated in the model as assembled before installation (e.g., assembled next the building in the model) and/or at a staged location in the model near where the components will be installed (e.g., highlight a location in or adjacent the building in the model where components are staged). Moreover, the location of the one or more components may be illustrated in relation to one or more users that have user computer systems (e.g., a mobile device) and illustrate the position of the user with respect to the one or more components. Alternatively, shipping information may be displayed to the user in the interface, and the user may select different shipping information to determine where the items for the shipment should be staged.

Any changes that the user makes to the model and/or project information may be transferred from the on-site mobile device back to the entity computer system in order to update the model for the entity users and/or for other customer users that may be accessing the model on one or more other user computer systems. Moreover, two or more user computer systems may be linked directly, or indirectly through the entity computer systems, in real-time, such that each user on the site would be able to view the status of one or more components in order to prepare the site, building, equipment, or the like for one or more components and/or installation thereof.

The functionality discussed above, as well as other functionality, of the systems, computer implemented methods and/or computer program products will be discussed in further detail throughout.

Embodiments of the invention comprise systems for aiding on-site building construction. The system comprises one or more memories having computer readable code stored thereon, a display, and one or more processors operatively coupled to the one or more memories and the display. The one or more processors are configured to execute the computer readable code to receive a model for a building project, and display the model of the building project on the display. The model comprises a plurality of components for constructing the building project.

In other embodiments, the systems further comprise one or more information capture devices operatively coupled to the one or more processors. The one or more processors are further configured to execute the computer readable code to capture item information from an item using the one or more information capture devices. The item information is used to identify one or more components of the plurality of components in the model that correspond to the item information captured, and indicate the one or more components in the model on the display that correspond to the item information captured.

In further accord with embodiments of the invention, the one or more information capture devices comprise a barcode scanner configured to scan a barcode or a camera configured to capture an image.

In other embodiments of the invention, the one or more processors are further configured to execute the computer readable code to provide shipping information in the display, wherein the shipping information comprises one or more delivery vehicles, one or more component groups, or one or more components. The one or more processors are further configured to execute the computer readable code to receive a selection of the one or more delivery vehicles, the one or more component groups, or the one or more components, and thereafter, indicate on the model in the display the one or more components associated with the selection of the one or more delivery vehicles, the one or more component groups, or the one or more components.

In still other embodiments of the invention, the one or more processors are further configured to execute the computer readable code to receive a selection of two or more components in the model, and identify component information for the two or more components selected. The component information comprises at least weights of the two or more components, and the one or more processors are further configured to execute the computer readable code to determine an aggregated weight of the two or more components based on the component information for the two or more components. The aggregated weight of the two or more components is utilized to determine when the two or more components can be pre-assembled adjacent the building project and erected as pre-assembled using a project asset.

In yet other embodiments of the invention, the one or more processors are further configured to execute the computer readable code to receive a selection of one or more components in the model, and indicate shipping information in the display, wherein the shipping information comprises one or more delivery vehicles, one or more component groups, or one or more components.

In other embodiments of the invention, the one or more processors are further configured to execute the computer readable code to display shipping information in the display, receive a selection of the shipping information from the display, and indicate in the model one or more components associated with the shipping information selected.

In further accord with embodiments of the invention, the one or more processors are further configured to execute the computer readable code to receive a selection of one or more components, identify a status for the one or more components, and indicate the status for the one or more components selected in the display.

In other embodiments of the invention, the one or more processors are further configured to execute the computer readable code to provide a project identifier for the building project to an entity system, and receive the model for the building project from the entity system based on the project identifier.

In still other embodiments of the invention, the systems further comprise one or more information capture devices operatively coupled to the one or more processors. The one or more processors are further configured to execute the computer readable code to capture an item identifier from an item using the one or more information capture devices. The one or more processors are further configured to provide the item identifier to the entity computer system, wherein the entity computer system utilizes the item identifier to determine the building project and the model for the item identifier, and thereafter receiving the model for the building project from the entity computer system.

In yet other embodiments of the invention, the model is a building information modeling (BIM) model, wherein the model is converted from an industry foundation classes (IFC) file to a lightweight OBJ/MTL model package optimized for mobile performance such that indexes from the IFC file that are not needed are removed.

In further accord with embodiments of the invention, the one or more processors are further configured to execute the computer readable code to indicate in the model one or more components associated with shipping information selected, and determine staging information for the one or more components. The one or more processors are further configured to execute the computer readable code to provide the staging information on the display for directing delivery of the one or more components to one or more staging locations, and update a status of the one or more components as being staged.

In other embodiments of the invention, the one or more processors are further configured to execute the computer readable code to receive a damage status indicating that one or more components are damaged, provide the damage status to an entity computer system, and receive shipment information for one or more replacement components, wherein the one or more replacement components are replacements for one or more damaged components.

Embodiments further comprise systems for aiding on-site building construction. The systems comprise one or more memories having computer readable code store thereon, and one or more processors operatively coupled to the one or more memories. The one or more processors are configured to execute the computer readable code to receive a request for a model from one or more user computer systems, and provide the model to the one or more user computer systems. The model comprises a plurality of components for constructing a building project.

In other embodiments of the invention, the one or more user computer systems are operatively coupled to one or more information capture devices. The one or more user computer systems are configured to capture item information from an item using the one or more information capture devices. The one or more user computer systems are further configured to identify one or more components of the plurality of components in the model that correspond to the item information captured, and indicate the one or more components in the model on the display that correspond to the item information captured.

In still other embodiments of the invention, the one or more user computer systems are further configured to receive a selection of one or more components, identify a status for the one or more components, and indicate the status for the one or more components selected in the display. The one or more processors are further configured to execute the computer readable code to receive an updated status of the one or more components in the model from the one or more user computer systems, and store the updated status of the one or more components.

Embodiments of the invention further comprise computer implemented methods for aiding on-site building construction. The method comprises receiving, by one or more processors, a model for a building project, and displaying the model of the building project on a display operatively coupled to the one or more processors. The model comprises a plurality of components for constructing the building project.

In other embodiments of the invention, the methods further comprise capturing, by the one or more processors, item information using an information capture device operatively coupled to the one or more processors. The methods further comprise identifying, by the one or more processors, one or more components from the plurality of components in the model that correspond to the item information captured, and indicating the one or more components in the model in the display that correspond to the item information.

Embodiments of the invention further comprise computer program products for aiding on-site building construction. The computer program products comprise at least one non-transitory computer-readable medium having computer-readable program code portions embodied therein. The computer-readable program code portions comprise an executable portion configured to receive a model for a building project, and an executable portion configured to display the model of the building project on a display. The model comprises a plurality of components for constructing the building project.

In other embodiments of the invention the computer program products further comprise an executable portion configured to capture item information using an information capture device, an executable portion configured to identify one or more components from the plurality of components in the model that correspond to the item information captured, and an executable portion configured to indicate the one or more components in the model in the display that correspond to the item information.

Embodiments of the invention comprise systems for aiding on-site building construction. The systems comprise one or more memories having computer readable code stored thereon, a display, and one or more processors operatively coupled to the one or more memories and the display. The one or more processors are configured to execute the computer readable code to receive a model for a building project, and display the model of the building project on the display. The model comprises a plurality of components for constructing the building project.

In other embodiments of the invention, the one or more processors are further configured to execute the computer readable code to receive a status for one or more components, update the model with the status for the one or more components, and share the model including the status with one or more other user computer systems by linking to the one or more other user systems directly or through one or more entity systems.

In further accord with embodiments of the invention, the status is an assembly prepping status, and sharing the status allows one or more other users to prepare equipment or a building to receive the one or more components.

In still other embodiments of the invention, the one or more processors are further configured to execute the computer readable code to indicate in the model one or more components associated with shipping information selected and determine staging information for the one or more components. The one or more processors are further configured to provide the staging information on the display for directing delivery of the one or more components to one or more staging locations, and updating a status of the one or more components as being staged.

In yet other embodiments of the invention, the system further comprises one or more location determining devices operatively coupled to the one or more processors. The one or more processors are further configured to execute the computer readable code to receive a selection to log a location of one or more components, and receive a selection of the one or more components. The one or more processors are further configured to execute the computer readable code to determine a location of the system based on the location determining device, and store the location of the one or more components.

In other embodiments of the invention the one or more processors are further configured to execute the computer readable code to receive a request to identify the location of the one or more components, access the location of the one or more components stored, and illustrate in the model the location of the one or more components. The one or more processors are further configured to execute the computer readable code to identify a current location of the system, and illustrate the current location of the system in the model.

In further accord with embodiments of the invention, the one or more processors are further configured to execute the computer readable code to direct a user to the location of the one or more components by illustrating a movement of the system with respect to the location of the one or more components, and display the movement of the system with respect to the location of the one or more components in the display.

In still other embodiments of the invention, the systems further comprise one or more information capture devices operatively coupled to the one or more processors. The one or more processors are further configured to execute the computer readable code to capture surroundings of the system, display the surroundings on the display, and superimpose the model in the surroundings on the display.

In yet other embodiments of the invention the systems further comprise one or more information capture devices operatively coupled to the one or more processors. The one or more processors are further configured to execute the computer readable code to capture item information from an item using the one or more information capture devices. The one or more processors are further configured to execute the computer readable code to identify one or more components of the plurality of components in the model that correspond to the item information captured, and indicate the one or more components in the model on the display that correspond to the item information captured.

In other embodiments of the invention, the one or more processors are further configured to execute the computer readable code to provide shipping information in the display, wherein the shipping information comprises one or more delivery vehicles, one or more component groups, or one or more components. The one or more processors are further configured to execute the computer readable code to receive a selection of the one or more delivery vehicles, the one or more component groups, or the one or more components, and indicate on the model in the display the one or more components associated with the selection of the one or more delivery vehicles, the one or more component groups, or the one or more components.

In further accord with embodiments of the invention, the one or more processors are further configured to execute the computer readable code to receive a selection of two or more components in the model, and identify component information for the two or more components selected, wherein the component information comprises at least weights of the two or more components. The one or more processors are further configured to execute the computer readable code to determine an aggregated weight of the two or more components based on the component information for the two or more components, and wherein the aggregated weight of the two or more components is utilized to determine when the two or more components can be pre-assembled adjacent the building project and erected as pre-assembled using a project asset.

In yet other embodiments of the invention, the one or more processors are further configured to execute the computer readable code to receive a selection of one or more components in the model, and indicate shipping information in the display, wherein the shipping information comprises one or more delivery vehicles, one or more component groups, or the one or more components.

In still other embodiments of the invention the one or more processors are further configured to execute the computer readable code to display shipping information in the display, receive a selection of the shipping information from the display, and indicate in the model one or more components associated with the shipping information selected.

In other embodiments of the invention, the one or more processors are further configured to execute the computer readable code to receive a selection of one or more components, identify a status for the one or more components, and indicate the status for the one or more components selected in the display.

Embodiments of the invention further comprise systems for aiding on-site building construction. The system comprises one or more memories having computer readable code store thereon, and one or more processors operatively coupled to the one or more memories. The one or more processors are configured to execute the computer readable code to receive a request for a model from one or more user computer systems, and provide the model to the one or more user computer systems. The model comprises a plurality of components for constructing a building project.

In other embodiments of the invention, the one or more user computer systems are configured to receive a status for one or more components, update the model with the status for the one or more components, and share the model including the status with one or more other user computer systems by linking to the one or more other user systems directly or through one or more entity systems.

Embodiments of the invention further comprise a computer implemented method for aiding on-site building construction. The method comprises receiving, by one or more processors, a model for a building project, and displaying the model of the building project on a display operatively coupled to the one or more processors. The model comprises a plurality of components for constructing the building project.

In other embodiments of the invention, the method further comprises receiving, by the one or more processors, a status for one or more components, and updating the model with the status for the one or more components. The method further comprises sharing, by the one or more processors, the model including the status with one or more other user computer systems by linking to the one or more other user systems directly or through one or more entity systems.

Embodiments of the invention further comprise a computer program product for aiding on-site building construction, the computer program product comprising at least one non-transitory computer-readable medium having computer-readable program code portions embodied therein. The computer-readable program code portions comprise executable portions configured to receive a model for a building project, and display the model of the building project on a display. The model comprises a plurality of components for constructing the building project.

In other embodiments of the invention, the computer program product further comprises executable portions configured to receive a status for one or more components, update the model with the status for the one or more components, and share the model including the status with one or more other user computer systems by linking to the one or more other user systems directly or through one or more entity systems.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
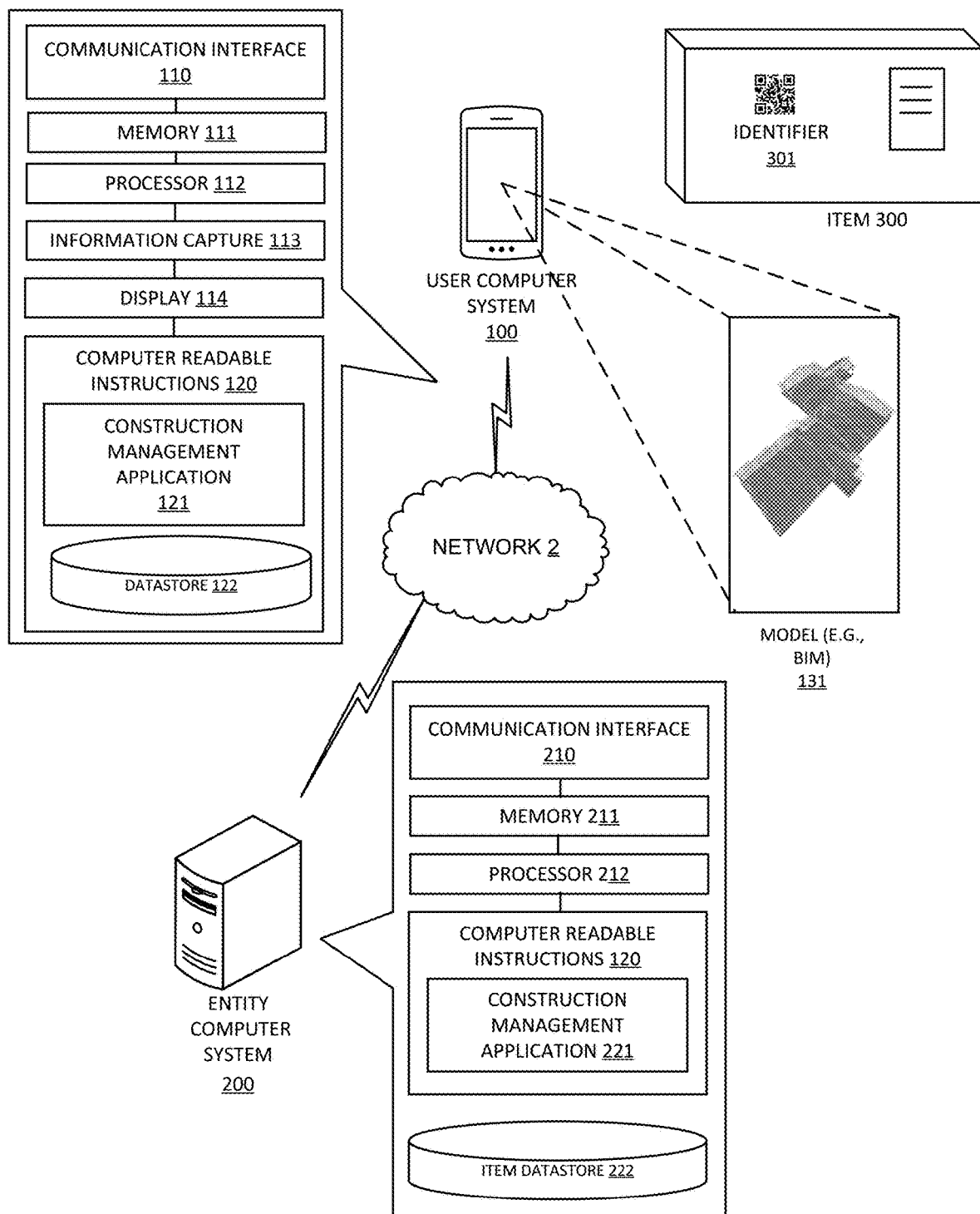
Figure 2A:
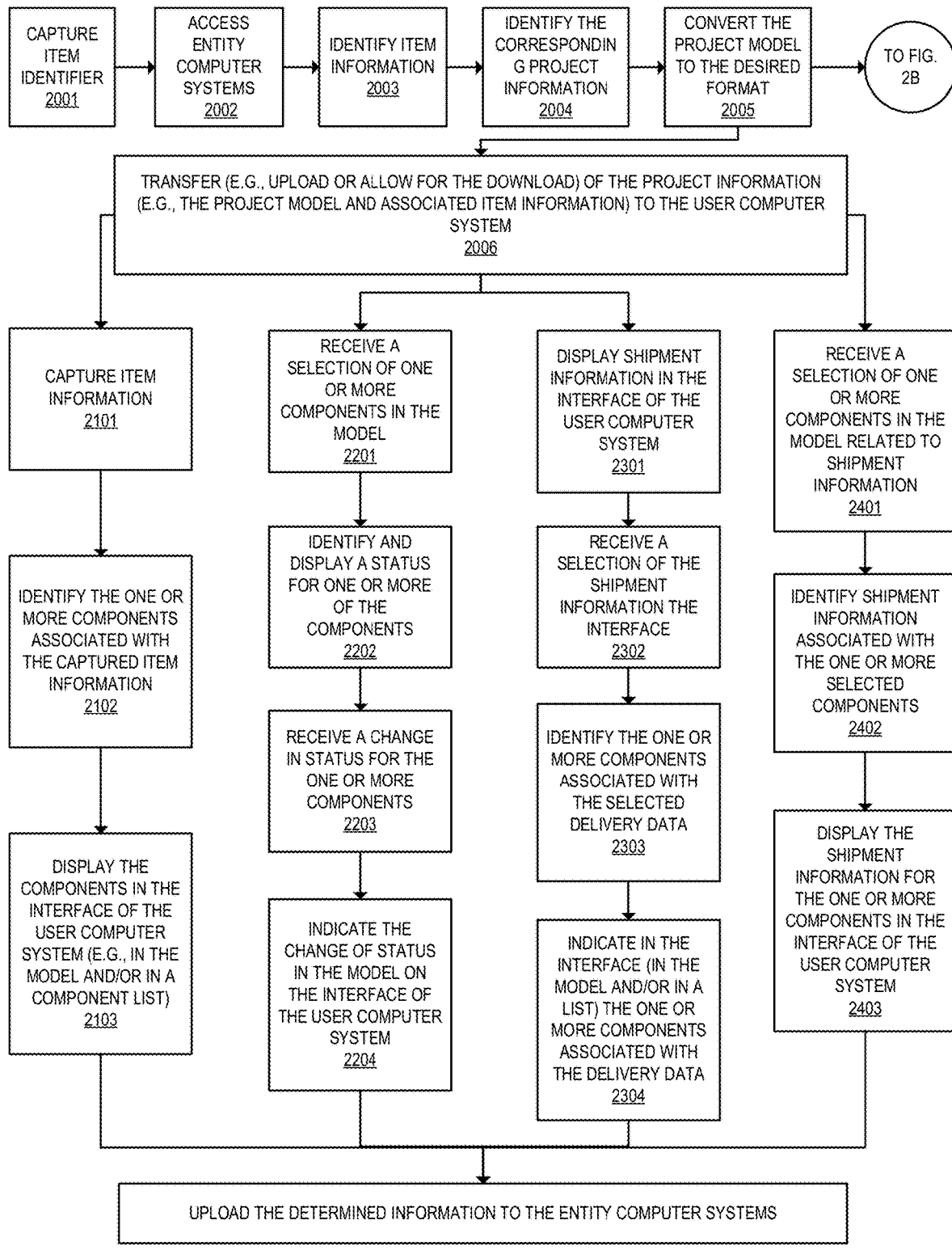
Figure 2B:
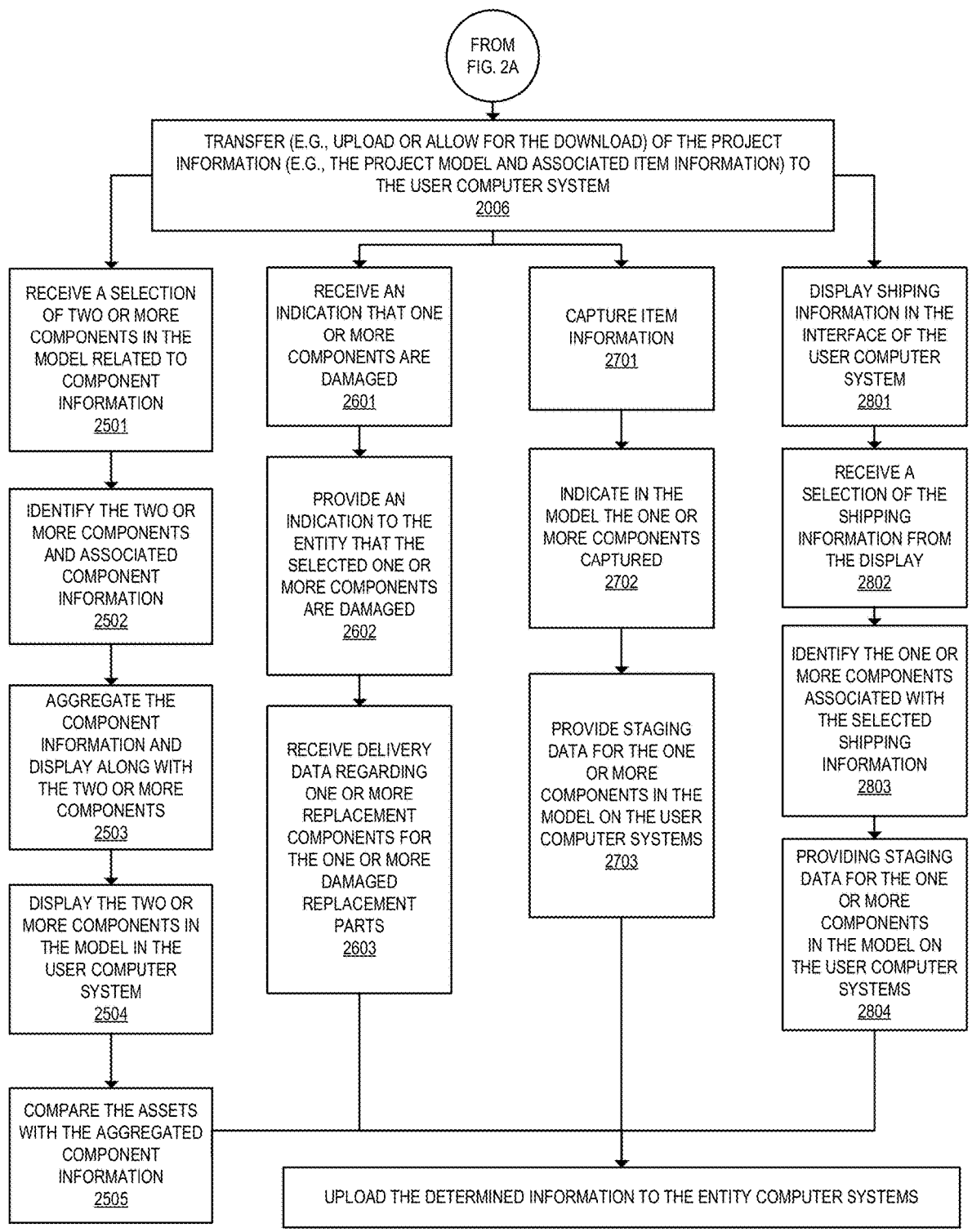
Figure 3:
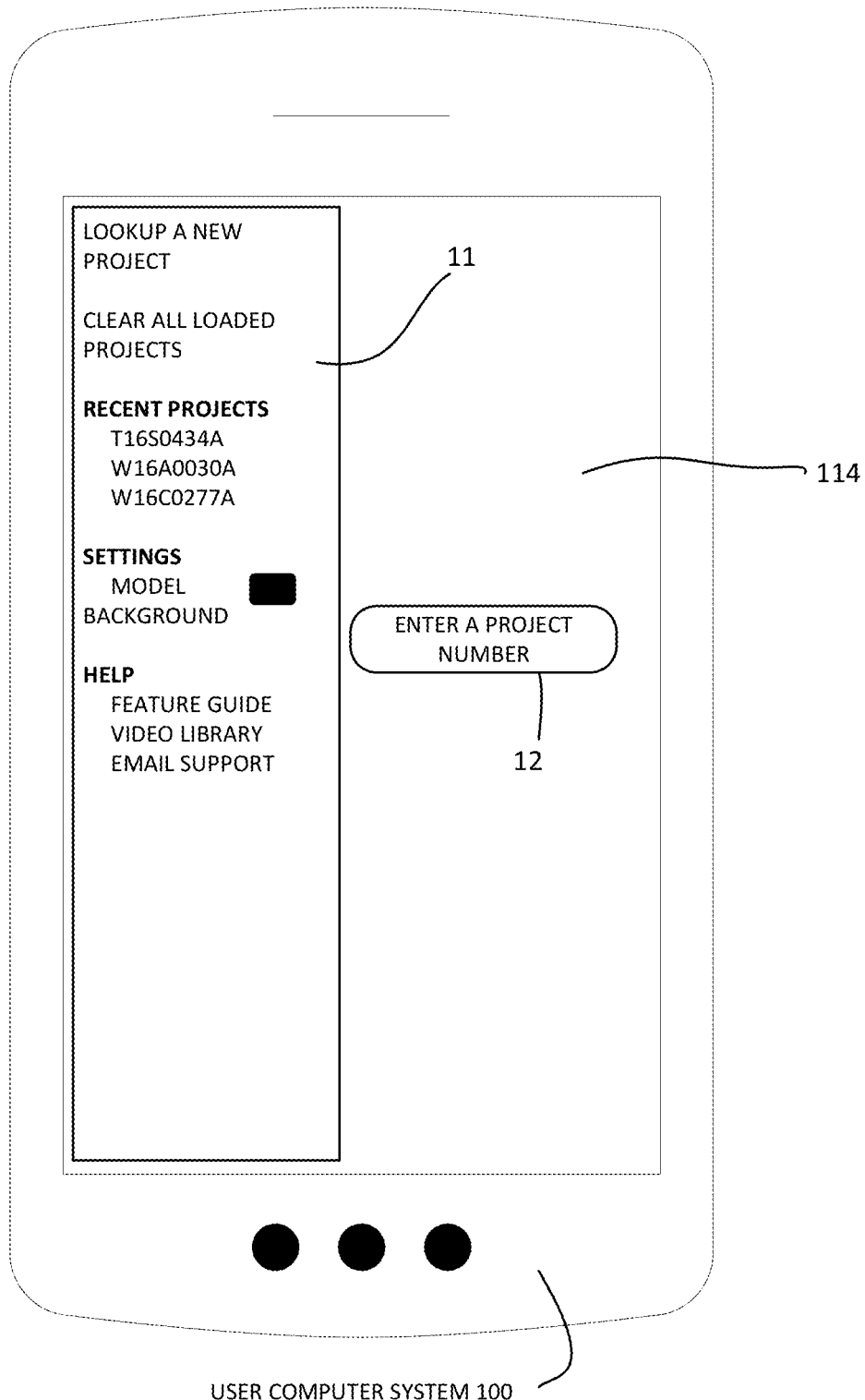
Figure 4:
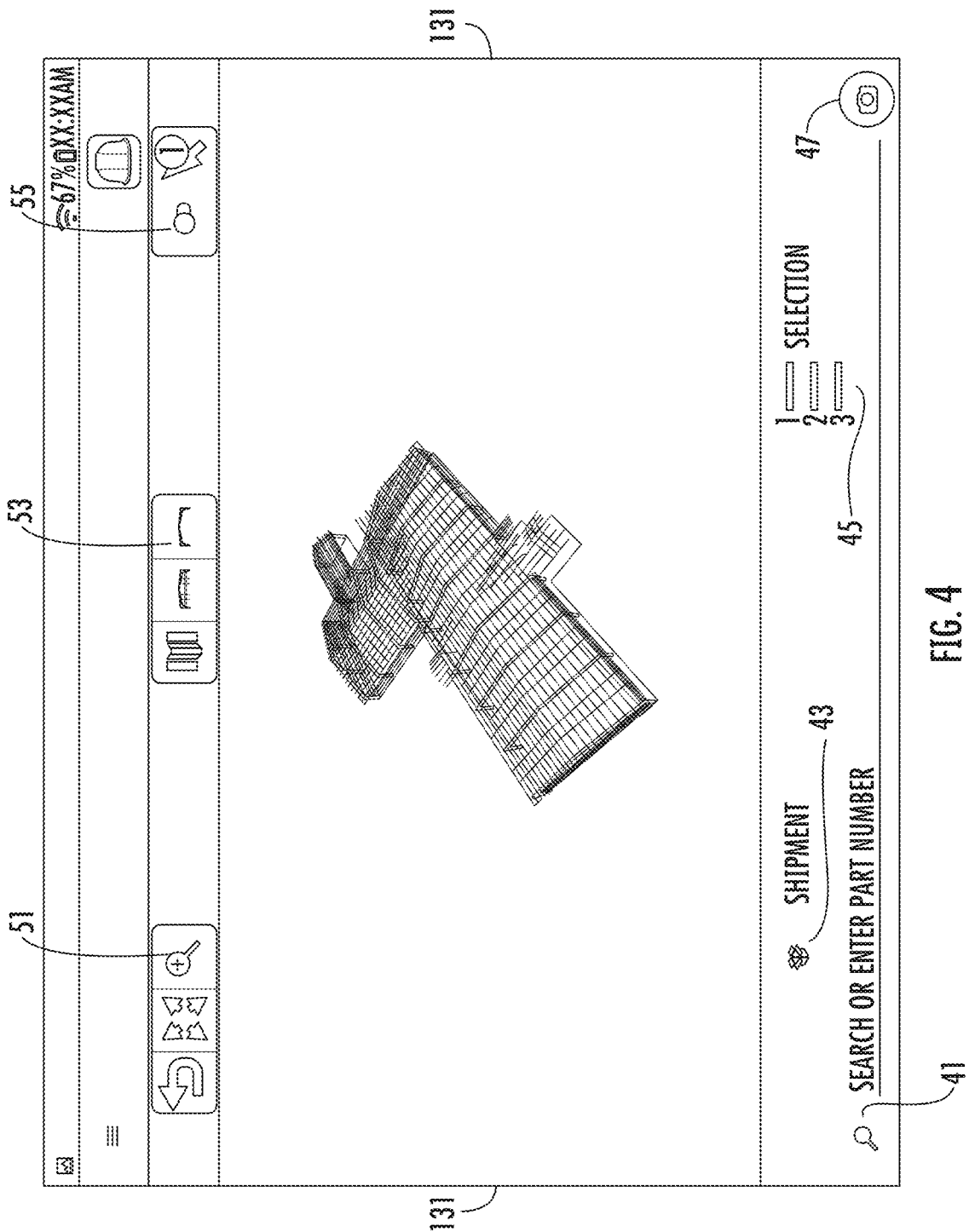
Figure 5:
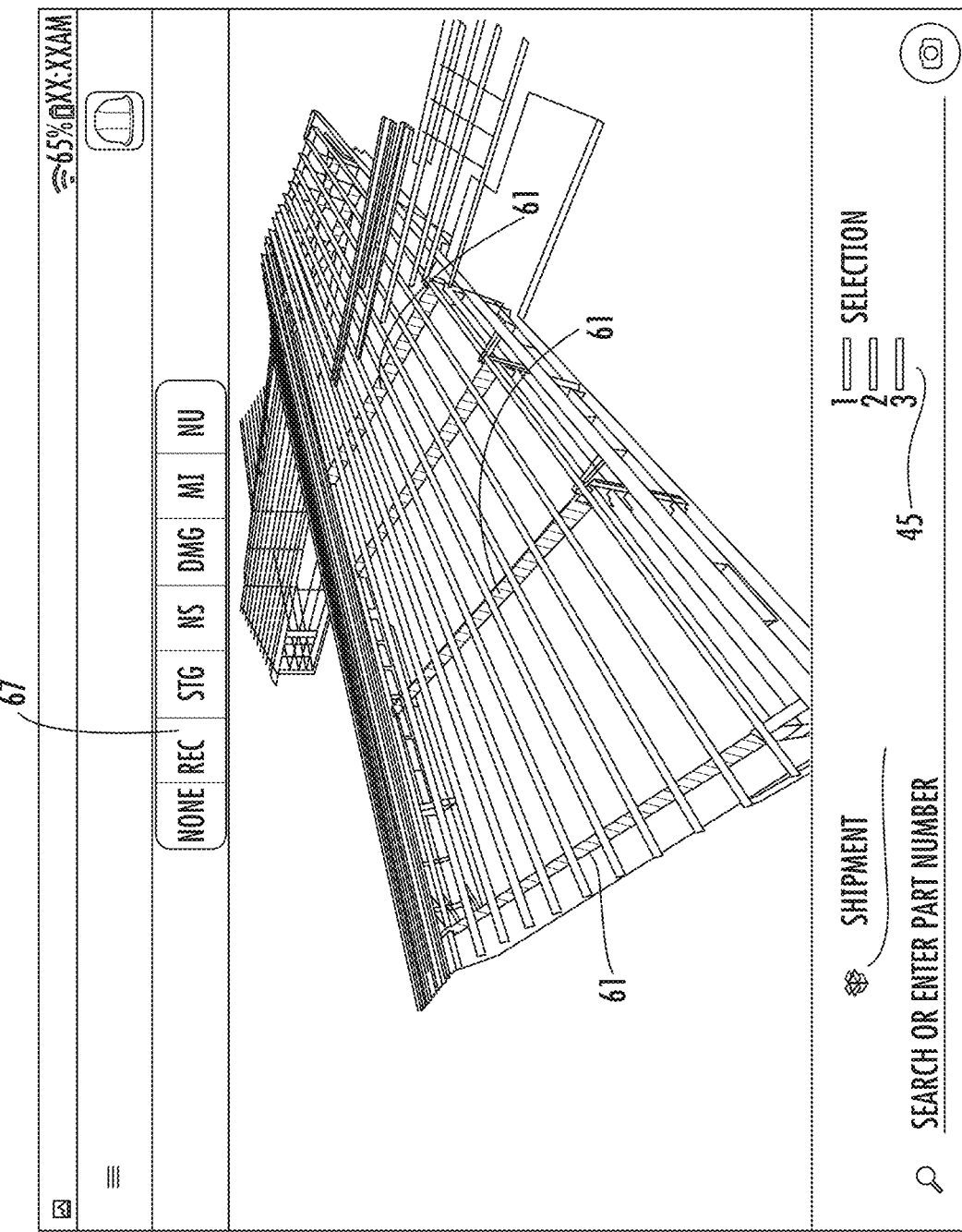

Having thus described embodiments of the invention in general terms, reference will now be made to the accompanying drawings, wherein;

FIG. 1 provides an illustration of a system environment in accordance with embodiments of the invention;

FIG. 2a provides a process flow illustrating features of the system in accordance with embodiments of the invention;

FIG. 2b provides a process flow illustrating features of the system in accordance with embodiments of the invention;

FIG. 3 provides a sample user interface menu in accordance with embodiments of the invention;

FIG. 4 provides a sample user interface displaying a model in accordance with embodiments of the invention;

FIG. 5 provides a sample user interface displaying a model and component status in accordance with embodiments of the invention.

Figure 6A:
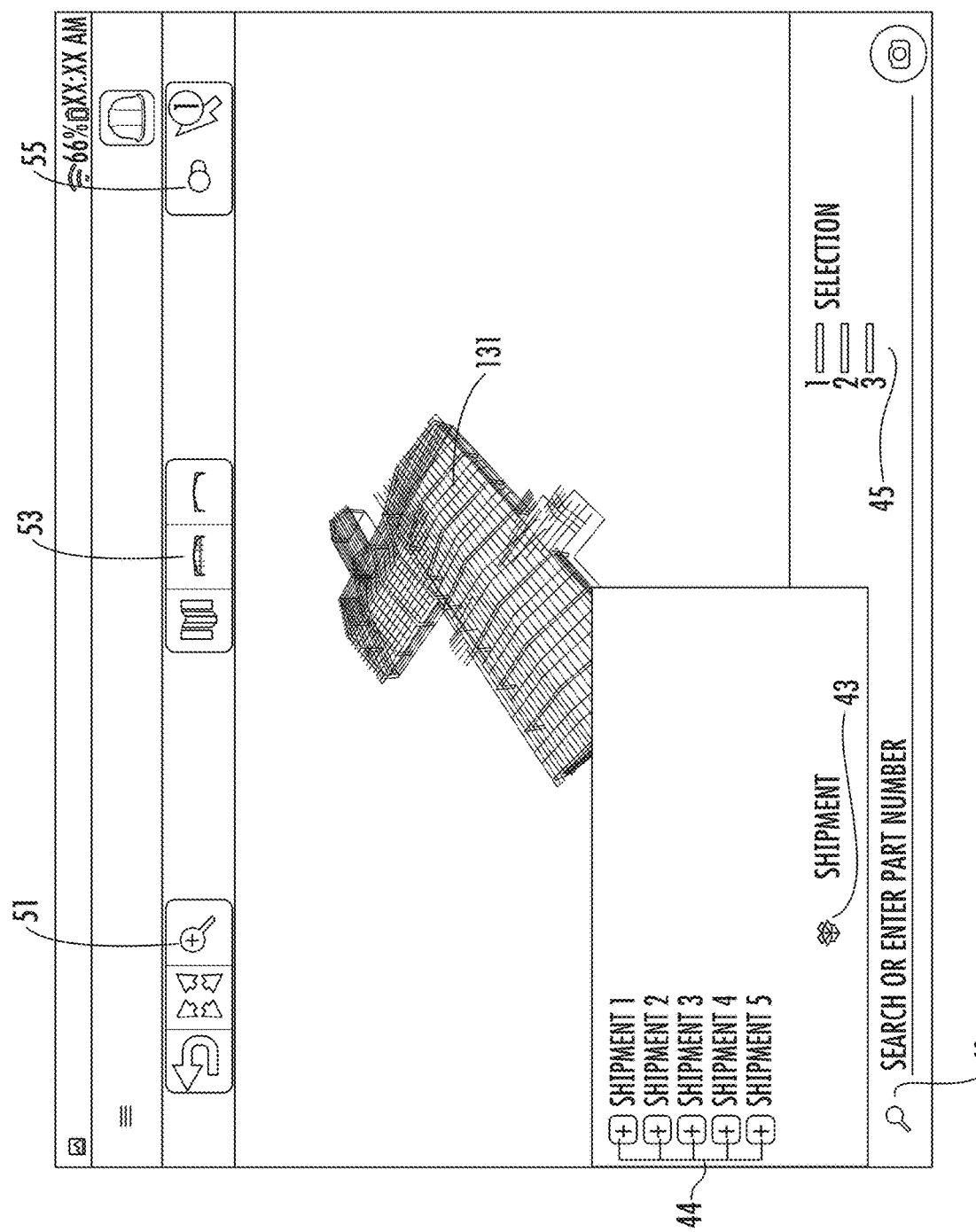
Figure 6B:
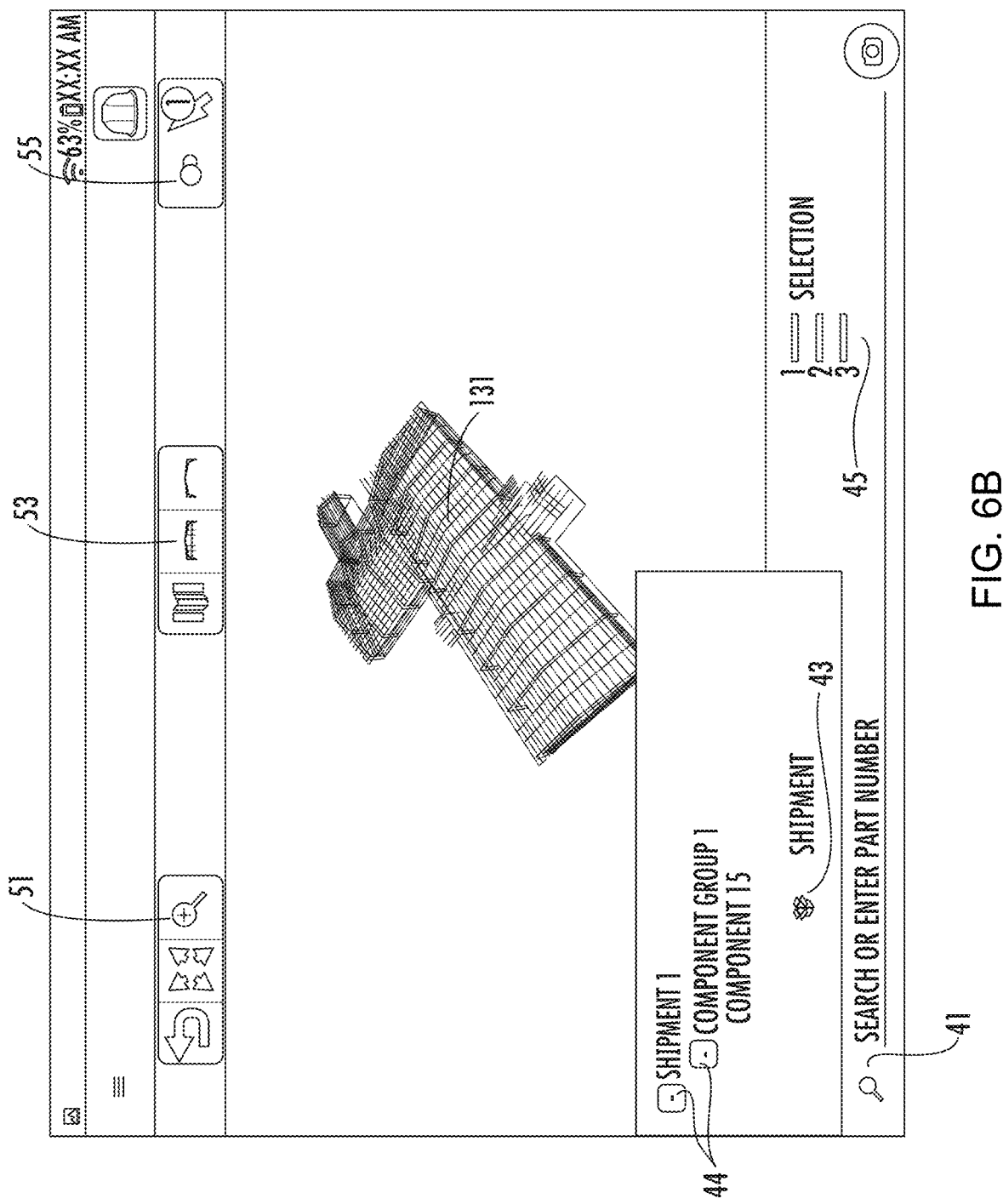
Figure 7:
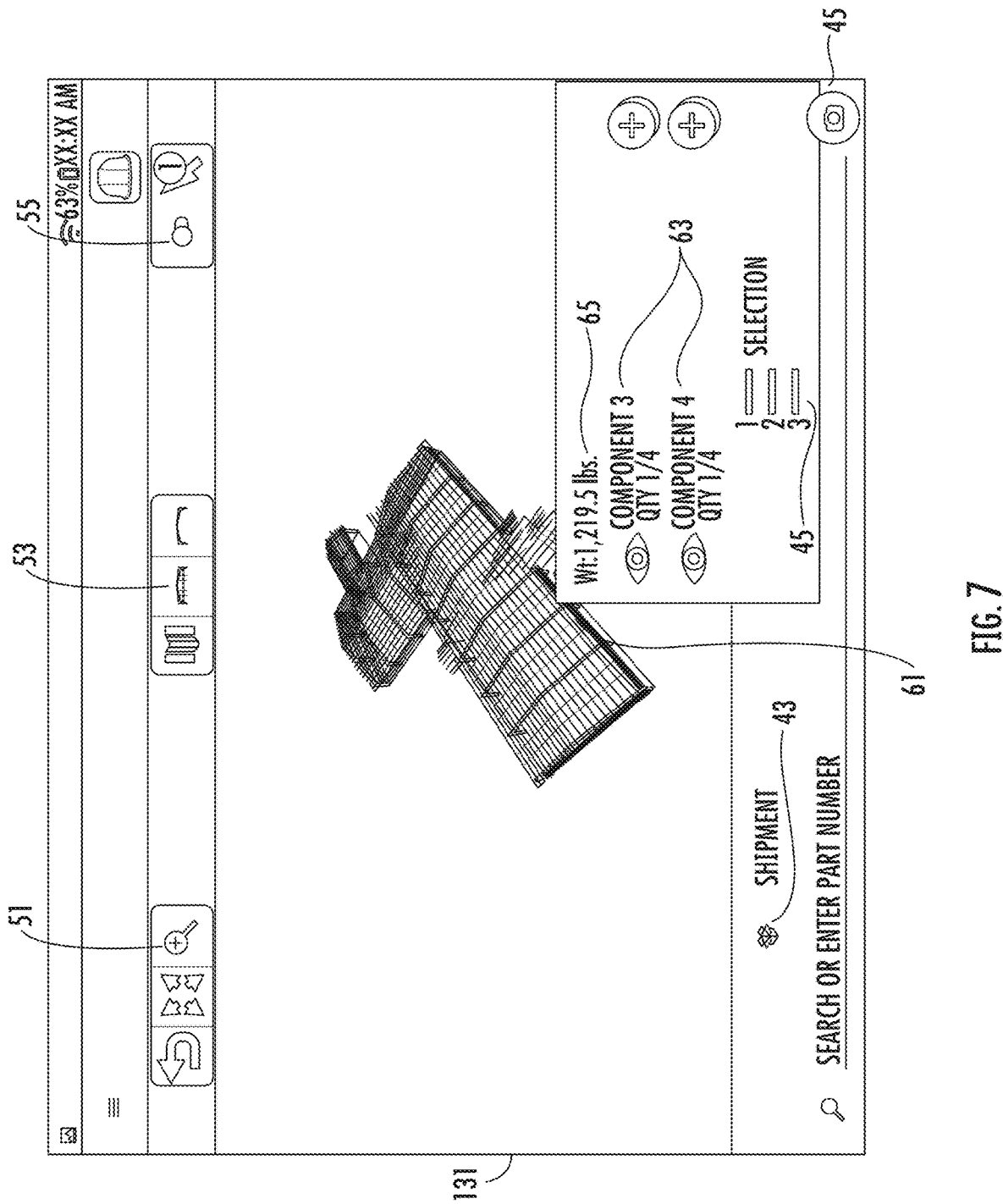
Figure 8:
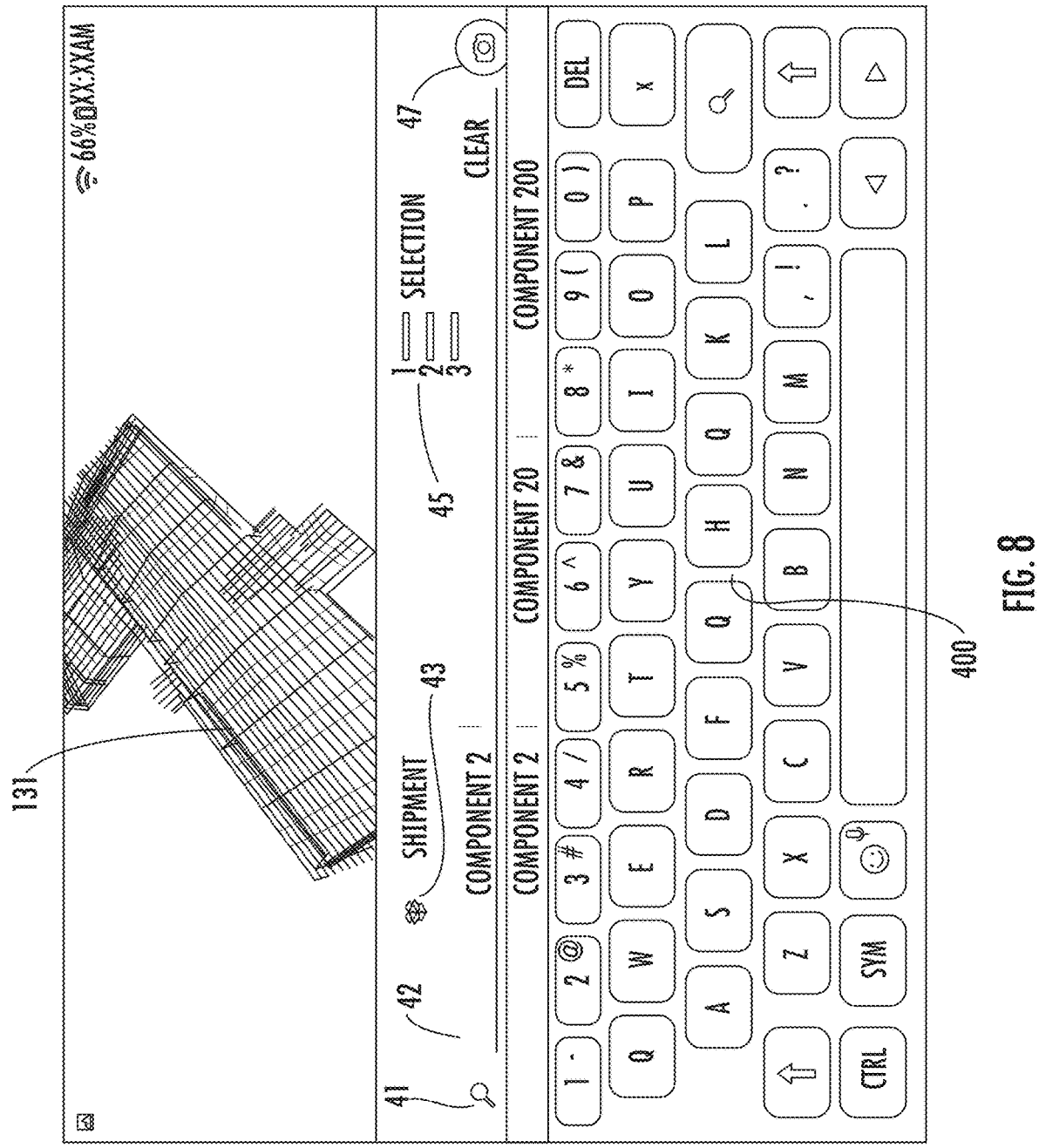
Figure 9:
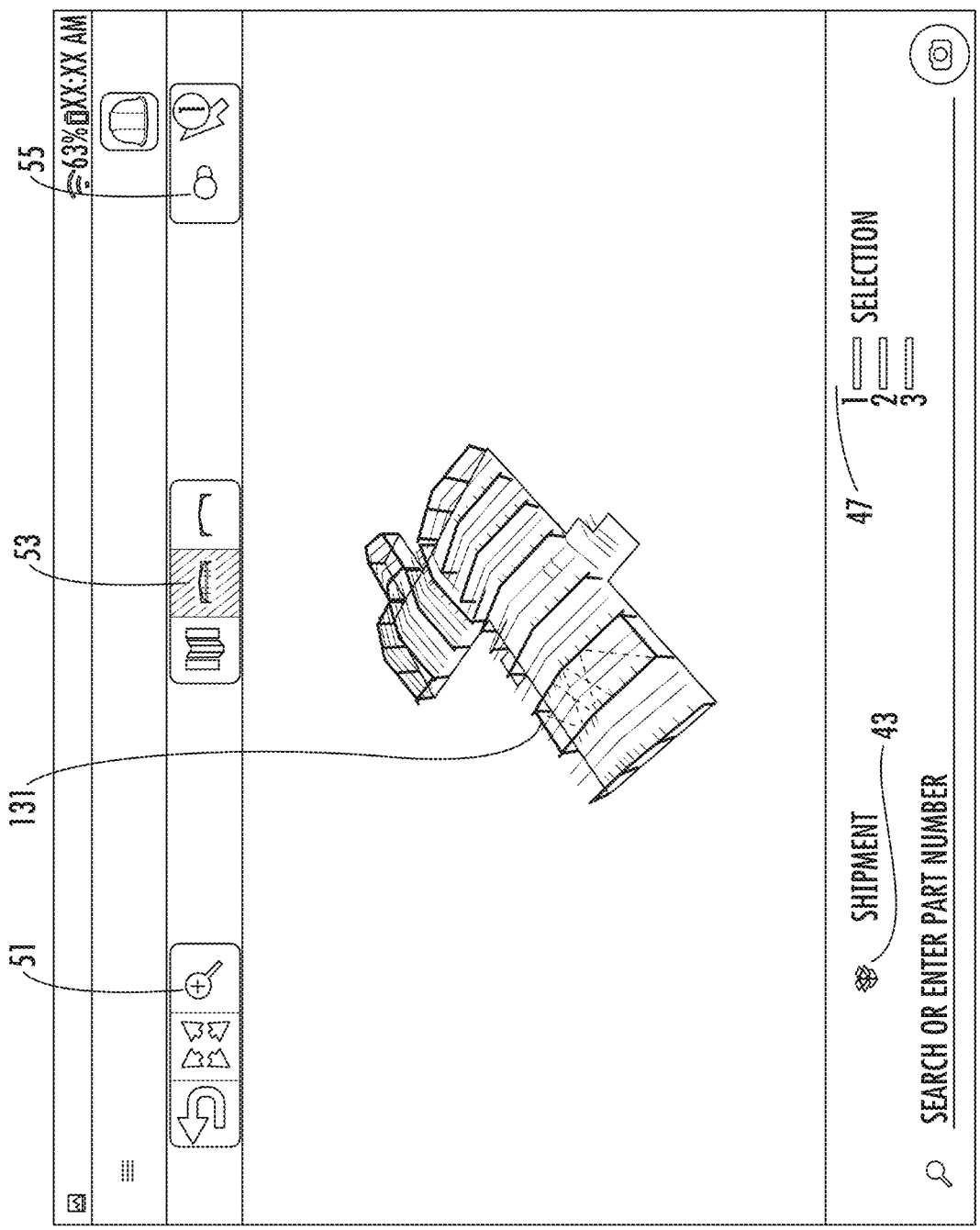

FIG. 6a provides a sample user interface displaying a model and shipping menu in accordance with embodiments of the invention;

FIG. 6b provides a sample user interface displaying a model and expended shipping menu in accordance with embodiments of the invention;

FIG. 7 provides a sample user interface displaying a model featuring selected components and the associated component information in accordance with embodiments of the invention;

FIG. 8 provides a sample user interface displaying a model and a search functionality in accordance with embodiments of the invention;

FIG. 9 provides a sample user interface displaying a model as displaying only a portion of the building using a layering functionality in accordance with embodiments of the invention.

DETAILED DESCRIPTION

Embodiments of the present invention will now be described more fully hereinafter with reference to the accompany drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like number refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As may be appreciated by one of skill in the art, the present invention may be embodied as a system, method (computer implemented or otherwise), computer program product, or a combination of the foregoing. Accordingly, the present invention may take the form of an entirely software embodiment (including firmware, resident software, microcode, and the like) or an embodiment combining software and hardware aspects that generally may be referred to herein as a "system." Furthermore, certain aspects of embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, or device. More specific examples of the computer-readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device, or other storage device.

Computer program code for carrying out certain operations of embodiments of the present invention may be written in an object oriented, scripted, or unscripted programming language such as Java, Perl, Smalltalk, C++, SAS or the like. However, the computer program code for carrying out operations of embodiments of the present invention may also be written in conventional procedural programming language, such as the "C" programming language or other similar programming language. However, any programming language may be used for carrying out certain operations of embodiments of the present invention.

Embodiments of the present invention provide a portable system that allows for tracking, modeling, displaying, calculating information on, and managing a construction project. The system provides a user access to information related to a construction project remotely and in some cases in real-time (e.g., in real-time, near real-time—seconds, tens of second, minutes, or the like). The users may include customer users (e.g., employees, contractors, subcontractors, or the like of the customer) associated with a customer that is responsible for a construction project (e.g., building a building on-site, or the like), or the users may include entity users (e.g., employee, contractors, subcontractors, or the like) that are designing the building, determining components for the building, manufacturing components for the building off-site, shipping components for the building, or the like. In some embodiments, at least some of the entity users may be customer users, for example, the users designing the building may be the same as the users building the building, and the entity users may be entity providing the components. As such, when described herein a user may be any type of user that is acting on behalf of any entity (e.g., supplier, customer, or the like). Generally, it should be understood that in some embodiments the entity users may upload models, shipping information (e.g., information regarding the items' shipment dates and times, items in the shipments, or the like), item information (e.g., weights, sizes, quantity, or other properties) into the construction management application. Alternatively, the customer users may transfer (e.g., download or upload) project information related to the models, shipping information, item information, status information for the project, or the like, which will be discussed herein. As such, users can track, model, display, calculate, and otherwise manage the project from a mobile device at a construction site, at a design facility, at a manufacturing facility, at a storage facility, on a shipment route, or the like. The system provides a number of advantages to the user in terms of both portability and ease of use. For example, as described herein the system will improve construction times, construction efficiency, labor costs, reduce material waste, help scheduling labor and project assets, and provide real-time information regarding delivery, components, and assembly processes and constraints.

FIG. 1 depicts a schematic of the system 1, in accordance with embodiments of the invention. As depicted in FIG. 1, the system comprises a user computer system 100, an entity computer system 200, and at least one item 300. The user computer system 100 may be any computing device comprising communication 110, memory 111, processor 112, information capture 113, and/or a display 114 devices, and computer readable instructions 120 stored in the memory 111 and configured to cause the processor 112 to run a construction management application 121. In some embodiments, the user computer system 100 may be a mobile device such as a mobile phone (e.g., smartphone, personal digital assistant, or the like), a tablet, laptop, or another type of mobile computing device. In other embodiments, the user computer system 100 may be a desktop computer or other type of computing device. The information capture device 113 may be any type of device that captures information, such as a camera that captures an image (e.g., image of a label, barcode, part number, component itself, or the like), a scanner that scans a barcode or other identifier (e.g., a scanner that may communicate with the mobile device through a wire or wirelessly), an electronic capture device that can electronically communicate with the identifier (e.g., near-field communication, RFID, or the like), or other like information capture device. The display 114 may be any display output device capable of displaying images and information to the user (e.g., screen, touchscreen, or other like display). The display 114, the construction management application 121 stored on the user computer system 100, and/or the construction management application 221 stored on the entity computer system 200 may utilize a dynamically responsive form factor to allow for the use on two or more displays, wherein the two or more displays are of different sizes. In some embodiments, the user computer system 100 comprises communication device 110 that is configured to let the user communicate over the network 2 with an entity computer system 200 and/or other user computer system (e.g., other users) or entity computer systems (e.g., third-party entities, or the like). In some embodiments, the user computer system 100 may comprise a data store 122 for storing data related to the user computer system 100, such as the construction management application 121. It should be understood that the system 1 illustrated in FIG. 1 may include the use of multiple user computer systems 100 used by one or more customer users and/or one or more entity users.

The entity computer system 200 may be any computing system comprising communication 210, memory 211, and processor 212 devices, and computer readable instructions 220 stored in the memory 211 and configured to cause the processor 212 to run a construction management application 221. The entity computing system 200 further comprises a datastore 221. In some embodiments, the entity computing system 200 may be an offsite server or servers. It will be understood, however, that the entity computing system 200 may be any computing system that comprises the aforementioned. The entity computer system 200 is further configured to communicate over the network 2 with the user computer system 100, and/or other user or entity systems.

Also shown in FIG. 1 is an item 300. The item 300 may be a delivery vehicle, packaging (e.g., a shipping crate, bundled components, or other packaging) associated with one or more components, one or more components (e.g., a beam, bar, joist, connector, or other components, all of which may be disassembled or at least partially assembled), equipment, materials (e.g., concrete, sand, or the like), or the like. As illustrated in FIG. 1, each item 300 may further comprise an identifier 301. As depicted in FIG. 1, the identifier 301 may be a barcode or QR code. However, it should be understood that in other embodiments, the identifier 301 may be a part number, label, part name, picture, SKU, UPC, part list, token number, RFID tag, electronic device, or other uniquely identifying piece of information. The identifier 301 may be affixed to the outside of the item 300, located within the item 300, may be the item itself (e.g., shape, size, color, or the like), located adjacent the item 300, or the like. It should be further understood that in the cases of the identifier 301 being an electronic device with its own communication device, it may be operatively coupled to the network 2 in the same or similar way as discussed with respect to the user computer system 100 and/or the entity systems 200.

In some embodiments, the information capture device 110 on the user computer system 100 captures the identifier 301 related to the item 300 (e.g., affixed to the item, located on the item, located within the item, the item itself, or the like) in order to determine information associated with the item 300. The user computer system 100 then communicates the captured identifier 301 or information associated with the identifier 301 (e.g., the information about the item may be determined locally or from a third-party, and then transferred) over the network 2 to the entity computer system 200. The entity computer system 200 then compares the received identifier 301, or information associated with the identifier, to information stored in the datastore 222. The datastore 222 of the entity computer system 200 holds information on all of the items, such as the delivery vehicles, shipment information, packaging, components, materials, or the like associated with projects (e.g., projects for which the entity is providing components for the customer or other entity associated with the customer). The information in the datastore 222 may also include the size, weight, composition, part number, price, and/or other relevant characteristics associated with items 300. Furthermore, the datastore 222 holds information related to the project or projects in which the identified item 300 is to be used. The project information includes project models and all of the item information for the project, such as component lists, schedules, schematics, models, drawings, notes, shipping manifests, component location, mating components, staging locations, and the like. After identifying the item 300 in the datastore 222, and the project for which the item 300 is used, the entity computing system 200 transmits the project information, including the item information for captured identifier 301, stored in the datastore 222 over the network 2 to the user computer device 100. It should be understood that the project information may be stored in one or more datastores 222 (e.g., an item datastore, a project model datastore, or the like), and as there may be one or more of entity computer system 200 and devices therein.

It should be understood that the construction management application 121, 221 may include portions that are stored on the user computer systems 100 (e.g., app, applet, downloaded software, or the like) and/or portions that are stored on the entity computer systems 200 (e.g., app, applet, downloaded software, base software, or the like). It should be further understood, generally, that any information described herein (e.g., project information, item information, or the like) may be stored locally in a decentralized location on the user computer system 100 and/or may be stored centrally in a centralized location on the entity computer system 200. As such, information may be captured, stored and/or accessed from various systems at various locations throughout the system 1.

Upon receiving the project information from the entity computing system 200, the user computing system 100 can then display project information on an interface on the display 114 of the user computer system 100. As shown in FIG. 1, the interface may include a model 131 or rendering of the project in a completed or partially completed state. In some embodiments the model 131 may be a building information model (BIM), or other similar model.

It should be understood that the project information (e.g., the project model, item information, or the like) may be captured, viewed, and/or used in any number of different ways. The functionalities of the system 1 provided through the construction management application 121, 221 will be described in more detail and with reference to the remaining Figures herein.

FIGS. 2a and 2b provide a process flow illustrating at least some of the functionally of the system 1. Moreover, FIGS. 3-9 illustrate various interfaces that are used to carry out the features illustrated in the process flow of FIGS. 2a and 2b. The interfaces illustrated in FIGS. 3-9 are discussed generally below, and in further detail with respect to the process flow in FIGS. 2a and 2b.

FIG. 3 illustrates a sample user interface comprising a menu 11 and an entry form 12. The menu 11 provides the user with a simple navigational tool to access various aspects of the invention, such as those described with reference to FIGS. 2a and 2b. As shown, the menu 11 may allow the user to access recently viewed projects, or change settings such as the background shown in the model interfaces. Additionally, the user interface illustrated in FIG. 3 features an entry form 12. The entry form 12 as depicted in FIG. 3 prompts the user to enter a project number, though it may prompt a user to enter other information such as a part number, a component number, a shipping number, or the like. Once the user has entered the information requested by the prompt, the user will be able to access the features described in more detail with reference to FIGS. 2a and 2b. Alternatively, as previously discussed above the user may utilize an information capture devices to identify the project, and thus the associated project model and item information.

As depicted in FIG. 4, the model display interface may comprise a search tool 41, a collapsible shipment menu 43, a selection menu 45, a camera capture tool 47, model viewer tools 51, component viewing tools 53, and selection tools 55. The search tool 41 allows a user to enter search terms for a component number to display in the model 131. Alternatively, a search may be started with the camera capture tool 47 (or other information capture tool that uses the information capture device 113). As discussed in greater detail throughout, a camera in the user computer system 100 may capture an image of the identifier 301 associated with an item 300, and retrieve information related to the item (e.g., by capturing a barcode and accessing project information for the barcode). The collapsible shipment menu 43 allows a user to view shipment information, select shipments (e.g., past, current, and/or future shipments), and view the components and materials associated with the shipments. The model viewer tools 51, component viewing tools 53, and selection tools 55 allow the user to interact with the model 131 in various ways. For example, the model viewer tools may comprise a back button for navigating between previous displays of the model 131, an expandable zoom tool that allows the user to use two-finger touch to zoom in on parts of the model 131, or a default zoom tool that zooms in on the model 131 by a preset value. Moreover, the component viewing tools 53 allow the user to configure the model 131 to only display certain components, such as primary framing (e.g., support structures, girders, joists, or the like), secondary framing (e.g., studs, purlins, or the like), and sheeting (e.g., decking, wall sheeting, or the like), or other selectable components of the model 131. The structural features may be displayed individually or in any combination. The selection tools 55 allow the user to turn on and off various modes of selection.

FIG. 5 illustrates the status interface for providing status functionality in accordance with embodiments of the present invention. As depicted in FIG. 5, the selected components 61 can be highlighted to depict their current status. How the components may be selected will be described in further detail throughout. The legend 67 provides color coded references corresponding to the highlighted selected components 61 to show the current status. The statuses may change automatically, or a user may manually change the statuses, as will be described throughout.

FIGS. 6a and 6b illustrate a shipment interface that illustrates some embodiments of the invention where the model 131 is shown with the collapsible shipment menu 43. As seen in FIGS. 6a and 6b, the shipment menu 43 comprises a list of expandable component menus 44. The expandable component menus 44 can be expanded to show detailed information (e.g.,) for shipments (e.g., past, current, and future shipments), including but not limited to schedules, components, quantities, part numbers, parts lists, weights, or the like component information).

FIG. 7 illustrates an assembly interface. As shown in FIG. 7, selected components 61 are selected and highlighted in the model 131. Additionally, in the selection menu 43, the part numbers 63 for the selected components 61 are displayed, along with the quantity of each selected component 63. Also in the selection menu 43, the system can display aggregated component information 65 for the selected components 61. It should be understood that in some embodiments the aggregated component information may be used to determine the capabilities of the project assets for the aggregated components.

FIG. 8 illustrates a search interface providing a search feature for the invention. As depicted in FIG. 8, the search menu allows a user to enter search terms for components, shipments, and the like. Search terms 42 may be entered by typing them in directly to the search menu 41 via the keyboard 400 (e.g., electronic or physical). Alternatively, a user may use the capture tool 47 to search for items, as discussed throughout.

FIG. 9 illustrates an embodiment of the invention utilizing the component viewing tools 53 to display different components in model 131. As shown in FIG. 9, the component viewing tools 53 are set to display different combinations of the components of the model 131. Accordingly, all components are selectively removable from view, allowing the model 131 to display only the desired components of the model.

Returning to FIGS. 2a and 2b, these figures illustrate some embodiments of the features of the present invention. As illustrated in FIG. 2a, a user may capture an identifier 301 from an item 300, as shown in block 2001. As noted above, item capture may occur in several ways. In some embodiments, the information capture device 113 may be a camera (e.g., a camera in a mobile device of the user) and the camera may be utilized to take an image of the identifier (e.g., barcode, QR code, product number or name, project number or name, an image of the component or material itself, or the like).

In other embodiments, the information capture device 113 may be a scanner, and a user may scan a barcode on an item (e.g., on a shipping crate, the components itself, a truck or other vehicle carrying the item, or the like). Similarly, item capture may occur by electronically communicating with the identifier 301, such as through the use of RF scanning, near field communication, wireless communication, or the like wherein the item or product is equipped with an electronic identifier (e.g., an emitter that emits a radio frequency signal, other electronic signal, or other electronic communication) that can be picked up by the user computer system 100 (e.g., the user's mobile device, or the like). In other embodiments, a delivery person or the item itself may be associated with a computer system (e.g., a mobile device associated with the delivery vehicle or the packaging) and the user computer system 100 may wirelessly communicate with the computer system associated with the item in order to receive the identifier 301 associated with the item 300. Alternatively, in other embodiments the user may manually enter the identifier by typing the identifier into the user computer system 100, such as by typing in an item number, shipment tracking number, or other like identifier.

In some embodiments, the user may manually enter a project number in the user computer system 100, select the project from a list of projects, or otherwise access the project through the user computer system 100. For example, in some embodiments the user computer system 100 may be dedicated user computer system 100 that only has access to one or more specific projects for the particular user or entity associated with the user. Once the project is accessed the user may select the identifier 301 associated with the item 300.

After capturing the identifier 301 for the item 300 and/or the project associated with the item 300 at block 2001, as illustrated by block 2002 the user computer system 100 may access the entity computer systems 200. To access the entity computer systems 200, the system establishes a communication connection over the network 2 between the user computer system 100 and the entity computer system 200. Communication may be established over any acceptable medium including but not limited to Wi-Fi, Bluetooth radiofrequency (RF) communication over a cellular network, wired connection, or the like. Communication may also be encrypted for additional security.

Next, in block 2003, the system is configured to identify item information corresponding to the captured identifier 301 for the item 300. Identifying item information comprises matching the captured identifier 301 for the item 300 with item information stored in the datastore 222. The datastore 222 comprises information about the item, such as the one or more components associated with the item 300, the project for which the item relates, or the like. The datastore 222 also stores item information such as the item's dimensions, weight, composition, and the like (e.g., of the one or more components).

In other embodiments, instead of transferring the identifier to the entity computer system 200, the identifier 301 may be used to identify at least a portion of the item information stored locally on the user computer system 100. For example, the item identifier 301 may be used by the user computers system 100 to access item information that may be stored locally on the user computer system 100 in order to identify the project with which the identifier 301 is related. The user computer system 100 may then use a least a portion of the item information to capture additional item information by communicating the item information with the entity computer systems 200. For example, a barcode may be used to identify a part number stored locally on the user computer system 100, which is then used to capture additional item information related to the item size, or the like stored on the entity computer system 200.

Regardless of how the item is identified, at block 2004, the item identifier 301 or the item information may be used to identify the project information corresponding to the identified item. The project information may include the project model (e.g., BIM model, or the like) and all of the associated item information for the project including the item information associated with the captured identifier 301. The project information comprises specifications, dimensions, weights, schedules, shipments, and all other information related to the construction and completion of the project. The project model further comprises any models and renderings for the project. Models and renderings may be stored in 3D file formats, including but not limited to OBJ/MTL, IFC, RVT, DWG, or the like. The model may be displayed in color identifying different statuses of the components. In some embodiments the model may display the actual color of the components used in the building to provide an accurate representation of the look of the building. In some embodiments, the model illustrated in the user computer system 100 may be navigated using gesture controls through the use of a touchscreen display 114, inferred sensors, cameras, or other gesture identification devices located in the mobile device.

At block 2005, the system converts the project model into the desired format for the particular user computer system 100 requesting the project information. The desired format may be any of the formats listed above, or other formats suitable for use on the user computer system 100, depending on the type and software used by the user computer system 100 (e.g., cell phone or tablet type, operating software, or the like). Once the project model is converted, the project model and associated item information are transferred (e.g., downloaded or uploaded) to the user computer system 100. In some embodiments, converting the model may be done to remove indices that are not necessary for optimized performance on the user computer system 100. For example, a fully indexed BIM model may not be necessary for the functions needed on the user computer system 100. As such, the model may be pared down to only the information needed for the functionality of the construction management system 121 operating on the user computer system 100 discussed herein. This pared down version of the model results in a smaller file size then traditional models (e.g., fully indexed BIM models), which allows for more functionality and faster response times of the construction management application 121 operating on the user computer system 100.

It should be understood that the system 1 may operate through the use of a customized converter product that converts the project information to the desired format as needed. Moreover, it should be further understood that the system 1 may operate through a cloud computing resource. That is, the entity computer system 200 may be cloud based hosting service that may be operated by a third party for the entity or by the entity itself. Additionally, the entity may store some aspects of the information, while a third-party stores other aspects of the information. Moreover, it should be understood that the construction management application 121 may be a dedicated application that is downloaded on the user computer systems 100, it may be a web-based solution that allows the user computer systems 100 to access the construction management application 222 located on the cloud computing resource, or both.

It should be further understood, that the user computer system 100 may receive the project model and associated item information in real-time, near-real time, on a scheduled basis, when requested, and/or only when changes are made either through the user computer system 100 or through the entity computer system 200. As such, the project model and the item information may be fully functional once downloaded locally (e.g., the system does not require Internet access to function on-site), and/or may require periodic access to the entity computer systems 200 for updates.

In some embodiments, the entity may update the project model, project information, and/or item information as the project design changes, as the items 300 are shipped, and or item information becomes available. For example, as the entity manufactures the components for the project, the entity users may use a user computer system 100 located at the entity to indicate that particular components have been manufactured. As such, the entity user may capture an identifier for an item (e.g., single components or group of components) and change a status of the item in the construction management application 221, such indicating a component as manufactured. Moreover, as the entity loads the items (e.g., packaging of one or more components, or the components itself) for shipment, the entity users may indicate that the particular items may be packaged, loaded, and/or shipped. The entity users may accomplish this by capturing an identifier 301 for an item 300 (e.g., packaging of one or more components, or the components itself) and changing the status to packaged, loaded, and/or shipped. The status of the items may be transferred from the user computer systems 100 (e.g., used by the entity users) and stored in the database 222 of the entity computer systems 200 for transfer to the customer on the user computer systems 100 utilized by the customer users on-site. Otherwise, the statuses may be transferred directly from the entity user computer systems to the customer user computer systems.

As such, as illustrated by block 2006 in both FIGS. 2a and 2b, the project information (e.g., project model and/or project information) is transferred (e.g., uploaded and/or downloaded) to the user computer system 100 that requested the project information.

As depicted in FIGS. 2a and 2b, once the system has transferred the project information (e.g., the project model and the associated item information) to the user computer system 100, the system 1 can be used by the customer user to perform a number of various tasks.

Starting with reference to block 2103, embodiments of the system 1 may be configured to display captured item information on an interface. With reference to block 2101, the user may utilize the system 1 to capture an item identifier 301, as previously discussed with respect to block 2001. As previously described, the item identifier 301 can be captured in any number of ways, including but not limited to barcode scanning, typed entry, RF scanning, or the like. However, in one embodiment, the customer may utilize a mobile device to capture an image of the item (e.g., use a mobile phone to capture an image of the packaging, the one or more components, the vehicle delivering the one or more components, or the like). As discussed, the captured identifier 301 may be the same identifier as previously captured from block 2001. In this case, in addition to determining the project, the identifier may be used to display on the interface the item (e.g., the one or more components scanned by the user on-site, or the like). Alternatively, the identifier may be an identifier 301 for the shipment after the shipment has been delivered and is located on site for a period of time. For example, a shipment may have been delivered in the past and a user may wish to recapture the identifier 301 to determine the one or more component associated with the past shipment, and/or in order to determine the location to stage the one or more components. In other examples, the identifier 301 may be associated with a particular staging location on-site (e.g., the identifier is associated with parts located in an area of construction site), and capturing the identifier 301 may provide a list of the components that are located at the staging location on-site or that should be located at the staging location on-site.

Once captured, at block 2102 the system identifies the one or more components associated with the captured identifier 301. For example, as previously discussed with respect to block 2003, after capturing the identifier for a shipment, the system 1 may access the item (e.g., one or more components) that has been stored locally on the user computer system 100, or may access the entity computer system 200 to access information stored by the entity that is associated with the captured identifier 301.

In some embodiments, if the captured identifier is a part of the project previously identified in block 2004, the system can 1 simply search the project information transferred to the user computer system at block 2006 to identify the one or more components associated with the captured identifier 301. For example, the captured identifier 301 may be associated with a shipping container comprising several components for the project. A user may capture an image of, or scan, a barcode on the shipping container, or otherwise capture an image of the item. The system 1 can then identify the components within the shipping container, by accessing the component information provided by the entity related to the particular shipment.

Once identified, as illustrated at block 2103, the system 1 can then display the components on the interface of the user computer system 100, for example, by highlighting the components in the model 131 and/or providing a component list in the interface. As previously discussed, once identified the one or more components associated with the identifier 301 may be displayed in the model 131 (e.g., by highlighting and/or changing the color), or provided in a list in the interface of the display 114 of the user computer system 100.

Moving to block 2201, the system 1 can receive a selection of one or more components in the model 131. For example, a customer user, from the user computer system 100, may select one or more components from the rendered model 131 provided in the interface on the display 114 of the user computer system 100. The selection may be made by selecting the component within the model 131 illustrated on the interface of the display 114 of the user computer system 100, by selecting the component from a list of components provided through the interface on the display 114 of the user computer system 100, or by capturing an identifier 301 associated with an item 300. For example, FIG. 4 illustrates an interface displaying the model 113. The user may select one or more components of the model 113 in the interface illustrated in FIG. 4, such as through the use of a touchscreen. At block 2202, in response the system 1 identifies a status of the one or more components selected and provides the status on the interface of the display 114 of the user computer system 100. The status of the one or more components may be stored locally on the user computer system 100 and/or may be accessed from the entity computer system 200, as previously discussed herein. The status may be related to a manufacturing status (e.g., the entity has made the component), packaging status (e.g., the component has been packaged), loading status (e.g., the component has been loaded for shipping), shipping status (e.g., the component has left the entity and is in route), received status (e.g., the component has been received on site), staged status (e.g., the component has been moved to a location on site ready for assembly), assembly prepping status (e.g., the component is ready for assembly, being loaded on equipment—fork lift or the like, transported for assembly, or the like), assembled status (e.g., the component has been assembled with other components outside of the building), installed status (e.g., the component has been installed on the building), damaged status (e.g., the components is damaged and needs be returned), returned status (e.g., the component has been returned to the entity), missing status (e.g., the component is not in the shipment), not used status (e.g., the component is not needed), or other like statuses. Once the status of the one or more components is determined, the system 1 will display the status of the one or more components on the interface of the display 114. For example, FIG. 5 illustrates one embodiment of the status interface, defining the statuses of the components as "None" (e.g., not assigned), "REC" (e.g., received) "STG" (e.g., staged), "INS" (e.g., installed), "DMG" (e.g., damaged) "MIS" (e.g., missing) "NU" (e.g., not used), or the like. The status of the one or more components may be displayed in the interface of the display 113, by changing the color of the component in the model 113, illustrating the status adjacent to the selected one or more components, display the status in a list of the one or more components, making the components with the status solid and the remaining components translucent, or the like. As shown in FIG. 5, the selected components 61 may be shown in the color of the respective status according to the legend 67. Alternatively, the one or more statuses illustrated in the legend 67 may be selected in order to display the corresponding one or more components associated with the selected one or more components in the model 131. For example, if the user selects the "installed" status in the legend 67, the components that have an installed status will be highlighted in the model 131.

At block 2203, the system 1 may receive a changed status indication for the one or more selected components. The status change may be the result of an event occurring such that the status identified at block 2202 is no longer accurate. For example, if one or more components were identified as "shipped," and those items arrived at the shipping destination, the system 1 would receive a status change for the one or more components and designate the items as "received." Alternatively, if the selected component is listed a "received" and/or "staged", and the component has instead been assembled (e.g., assembled to other components before installed in the building) or installed (e.g., installed in its final position within the building) then the system 1 may receive a status change for the one or more components. It should be understood that the status change may be made manually by the customer user. For example, the customer user may touch the component on the model 131 in the interface and select a new status. Alternatively, the customer user may capture an image of the identifier 301 for an item 300, which highlights the item in the interface (e.g., in the model 131 and/or in a parts list) and thereafter selects a status change for the highlighted item. In other embodiments, the status change may be made automatically. For example, the customer user may capture an identifier 301 associated with the one or more components and the one or more components may be automatically selected for a changed status. In this example, the location of the user computer system 100 is known through a location determining device in the user computer system 100 (e.g., GPS, or the like), as such, the customer user may be identified as located on-site. When the user captures the identifier 301 for the item, the status of the item 300 (e.g., the components) may be automatically changed to "received" at the site. Finally, at block 2204, the system 1 displays the changed status on the interface of the display 114 of the user computer system 100 (e.g., in the model 131, on a component list, or the like). In some embodiments, the changed status may be transferred (e.g., uploaded and/or downloaded) to the datastore 222 in the entity computer system 200, and/or transferred to other user computer systems 100 (e.g., other systems that other uses are accessing the project information). Thus, users (e.g., one or more customer users and/or one or more entity users) can be updated in real time with regard to the status of selected components.

In some embodiments of the invention one or more assembly prepping statuses may be utilized to improve the assembly process. Moreover, as discussed herein, it should be understood that two or more user computer systems 100 may be linked (e.g., directly to each other, or through access to the entity computer systems 200) in order to share the assembly prepping statuses for improving the assembly process. As such, as a component is being prepared for assembly, the system 1 (e.g., automatically through electronic communication between components and/or the user computer systems 100 of users or located on equipment, or manually through a selection made by a user—scanning a component) may change the assembly prepping status of the component within the model. For example, when a user is planning on assembling a particular component, the user may capture an identifier for the component (e.g., scan, select in the model, or the like) and select an assembly status, such as but not limited to loaded on a forklift, pre-assembly with one or more other components, in transit to assembly location, or like. Alternatively, when a component is loaded onto equipment, the component may interact with a user computer system 100 on the equipment and automatically update that the component has been loaded, or is otherwise moving (e.g., based on a location determining device—GPS, geo-fencing, or the like—on the component and/or on the equipment or user computer system that identifies the location of each). Once the assembly prepping status is selected by a first user, or automatically determined, the status is then updated in the model of the construction management application, and thereafter, transferred to one or more other users to notify the one or more other users of the assembly prepping status. In some embodiments, a notification may be sent to other users that have user computer systems 100 (e.g., hand-held, associated with equipment, or the like) to indicate the change in an assembly prepping status of a component. In this way, users are able to get into position, prepare equipment, and/or prepare construction materials in anticipation of the arrival of a component. For example, once a component is loaded on a forklift, a forklift operator or other user on the site may change an assembly prepping status to "loaded" and/or "in transit for assembly." As such, a crane operator or another user on the site that has an associated user computer system 100 may receive a notification (e.g., alert, pop-up in the modal display, or the like) that indicates a particular component is loaded and/or is in transit for assembly. As such, the crane operator and/or other user on the site may get equipment into position and/or otherwise prepare for receipt of the component for assembly. This same concept may also be applied to the shipping of items, in that users may be notified when a shipment of items are about to arrive on site (e.g., a truck is about to arrive, or the like) so that the users can prepare for unloading, unpacking, and/or assembly the shipped items. These embodiments of the invention may improve the assembly times associated with a construction product because the users are notified in advance of receipt of items (e.g., components, shipments, or the like) so that the users may prepare in advance of the arrival of the items.

In some embodiments, the system 1 is able to display, receive, and update delivery information for one or more selected deliveries. For example, starting at block 2301, the system 1 displays delivery information in an interface on the display 114 of the user computer system 100. FIG. 6a illustrates a sample shipment interface on the display 114. As shown in FIG. 6a, the shipment information may comprise a collapsible shipment menu 43. The shipment menu 43 may provide identifiers 301, or item information, for particular items 300, for the shipments associated with the project (e.g., all of the past, current, and future shipments for the project). The shipment menu 43 may further comprise expandable menus 44, wherein the expandable menus 44 illustrate detailed lists with the components within individual item shipments, as well as the component information.

At block 2302, the system 1 may receive a selection of the shipment information from the interface provided in the display 114. In other words, a user can select from the shipment menu 43 and the accompanying expandable menus 44 to obtain shipment information for particular items (e.g., a single component, multiple components, specific trucks, or crates, or the like). In some embodiments, the user may select one or more components within the shipment menu 43, and thereafter select an indicator to select and/or display all instances of the one or more components selected in the shipment menu 43. It should be further understood that a display indicator (e.g., illustrated as an eye in FIG. 7) may be used to display or hide one or more of the components. Moreover, a gesture may be used (e.g., swipe left, or the like) to remove one or more of the items from the shipment menu 43 (e.g., entire shipments, bundles of components, single components, or the like).

Once the particular shipment information related to the delivery vehicles, groups of components (e.g., crates, bundles, or the like), and/or one or more single components are selected, the system at block 2303 identifies the one or more components associated with the selected shipment information. For example, the system 1 may access the items (e.g., one or more components) that have been stored locally on the user computer system 100, or may access the entity computer system 200 to access information stored by the entity that is associated with the selected shipment information. At block 2304, the system 1 indicates in the model 131 the one or more components associated with the selected shipment information. In this respect, the system 1 permits the user to view past deliveries, current deliveries, upcoming deliveries, and identify in the model 131 exactly which components and/or materials are associated with the shipment (e.g., what components have arrived, what components will be arriving on future deliveries, or the like). FIG. 6b illustrates how the one or more components associated with the shipment may be illustrated in the model 131 on the interface of the display 114 of the user computer system 100. As shown in FIG. 6b, the components 61 may be highlighted in the model 131 and/or provided in the component list. It should be understood that in some embodiments, along with displaying the one or more components associated with the shipment, component information may also be provided in the interface, for example, component weight, size, composition, or other component information.

In other embodiments, instead of selecting shipment information from shipment lists or capturing shipment information based on an identifier 301 associated with a shipment, the system 1 can provide shipping information based on the selection of one or more components by the user. This functionality is illustrated beginning at block 2401, where the system 1 receives a selection of one or more components. For example, the user may select one or more components from the model 131 and/or from a component list. Alternatively, a user may input a part number or otherwise capture an identifier 301 for the component through the various methods discussed above (e.g., image capture, barcode scanning, RF scanning, or the like).

Once the one or more components are selected, as illustrated in block 2402, the system 1 identifies shipment information associated with the one or more selected components. In this regard, shipment information comprises whether or not the one or more components have been shipped, the day and time of the shipment, the type of vehicle delivering the shipment, the properties of the item being shipped (e.g., package or total component weight and/or size), component numbers, or other like shipment information. As discussed with other information, the shipment information may be stored locally on the user computer system 100 or may be accessed through the entity computer system 200. In some embodiments multiple components may be selected that are or will be shipped as a part of different shipments. As such, in some embodiments, the different shipping information may be accessed for the different components selected.

As illustrated in block 2403, the system 1 displays the identified shipment information for the one or more components selected in the interface of the user computer system 100. Displaying the shipping information may further comprise displaying the current status of the shipment and the estimated shipment day and time. Accordingly, users may plan projects based on an up-to-date shipment schedule for selected components. This feature of the invention allows the user to identify the shipping information associated with selected model components in order to aid the user in identifying the location of the selected parts on-site.

In other embodiments of the invention, the present invention allows the user to select two or more components in order to determine assembly procedures for the project. The system 1 can compute, display, and compare aggregated component information as well as the capabilities of project assets. In this regard, a user may calculate information on two or more components and determine whether a project asset can provide the necessary utility with respect to the two or more components. For example, a user may want to know whether a crane located on-site will be able to support the weight of several heavy assembled components, such as steel beams that have been pre-assembled apart from the final building project. The system 1 will be able to determine properties of the one or more components (in this case the weight of the selected steel beams) and compare that with the abilities of the project assets (in this case the load bearing capabilities of the project asset).

The above embodiment is illustrated in FIG. 2b beginning at block 2501. First, the system receives a selection of two or more components in the model 131. The selection may occur by the user selecting the two or more components using a touchscreen, by manual entry (e.g., using an identifier such as a part number), by selecting a shipment, by capturing an identifier 301 associated with the two or more components (e.g., individually taking an image of a barcode of each of the components), or by any other selection method. Once selected, the system 1 identifies the two or more components and associated component information, as illustrated in block 2502. For example, the component information may be determined by accessing the component information stored locally on the user computer system 100 and/or by accessing the entity computer system 200. As illustrated by block 2503 once the components and component information are identified, the system 1 aggregates the component information. For example, the component may be automatically aggregated, such as for example, the aggregated weights of the components, the aggregated size of the components, the aggregated components needed to assemble the selected components (e.g., the number of fasteners needed to assemble the components, or the like). In other embodiments, the user may select the information that the user wants to aggregate before the system 1 (e.g., the construction management application 121, 221) aggregates the information. For example, the user may request to aggregate the weight and size, and then select the components that the user wishes to aggregate.

As illustrated by block 2504, the system 1 then displays the two or more components and aggregated component information in the interface in the model 131 on the user computer system 100. FIG. 7 demonstrates one embodiments in which the interface illustrates the two or more components and the aggregated weights of the two or more components. As shown in FIG. 7, the two selected components 61 are highlighted on the model 131. Similarly, the selection menu 45 is shown on the user computer system 100 for displaying the aggregated information 65, such as the aggregated weight of the two or more components. Moreover, the selected components are listed in the selection menu 45 along with quantities of these components in the project. While the aggregated weight is displayed, it should be understood that the aggregate information 65 may be any type of aggregate information for the two or more selected components 61 such as height, width, length, volume, or the like.

Finally, at block 2505, the system can compare project assets with the aggregate information 65. Such comparison comprises analyzing known limitations of the assets (e.g., a weight rating, etc.) with the calculated aggregate component information. It should be understood that the user may use manually use the aggregated component information to determine if the project assets are sufficient for the aggregated component information. Alternatively, the project asset and the associated project asset capabilities (e.g., the weight, size, or the like capabilities of equipment) may be imputed or otherwise stored within the construction management application 121, 221 such that the aggregated component information may be automatically compared with the project assets.

Other functionality of the system 1 may include identifying damaged components and/or ordering one or more replacement or new components. As shown at block 2601, the system 1 may receive an indication from a user that one or more components are damaged. The indication may be received by manual input from the user in the construction management application 121, 221. For example, the user may select the one or more components in the model 131 or in a component list in the interface on the display 114 of the user computer system 100 that may be damaged. The user may then change the status associated with the one or more components to indicate that the one or more components are damaged. Alternatively, the system may be able to monitor certain components for damage. When damage is recognized, the system 1 can automatically receive an indication that the component is damaged. Automatic means for recognizing damage may comprise sensors affixed to the one or more components, though it should be understood that other means are appropriate.

Once damage is determined and indicated in the interface, as illustrated in block 2602, the system 1 provides an indication to the entity that the one or more selected components are damaged. For example, the user computer system 100 may communicate with the entity computer system 200 to provide an indication that one or more selected components are damaged. An indication may comprise an alert, a notice, an email, an automated telephone call, or the like. Typically, upon receiving the indication of one or more damaged components, the entity user is able to view the model 131 illustrating the exact location and component that is damaged. This provides improved identification of damaged components. As such, the entity arranges for shipment of one or more replacement components (or other replacement items). Alternatively, the system 1 may be configured to automatically arrange for shipment of replacement components upon receiving an indication that the one or more selected components are damaged. In either event, once shipment for replacement components has been arranged, the system 1 may receive shipment information regarding the one or more replacement components for the one or more damaged replacement components. In this regard, a user using the user computer system 100 can keep track of shipment information regarding replacement components immediately or shortly after the system 1 has received an indication that one or more components are damaged.

In some embodiments of the invention, in order to document the damage to the one or more components the user may capture information about the damaged component and send the damage information to the entity. For example, a user may capture a photo of the damaged component and either send the photo to the entity, or associate the photo of the component with the component in the model 131. As such, when the entity user is viewing the damaged component in the model 131, the entity user may be able to see the damage. In other embodiments, the damage information may be captured and/or provided to the entity in other ways.

Other features of some embodiments of the invention, include providing staging information for the project. As such, the system 1 is capable of formulating and displaying staging information for one or more components. As used herein, staging information refers to where the components should be placed on-site in order to speed up assembly of the components to each other and/or for installation in the building. Staging information may be used to determine where the components should be located, whether the components may be assembled, constructed, erected, built, arranged, or the like, and when such assembly should occur. As an example, it may be desirable to construct a project in small subsets of the project that can be combined to complete the entire project. The smaller subsets may be beneficial because they can be assembled off-site, on-site under improved conditions (e.g., in covered areas, or in advance of installation into the building), in a shorter time, or for less cost because of reduced labor and/or project assets costs. Thus, staging information is useful to determine where the one or more components and/or materials should be located on-site in order to improve construction of the project. The user may use the staging information to determine the assembly process for the project.

Embodiments of staging processes are illustrated in FIG. 2b beginning at blocks 2701 and 2801. At block 2701, the system captures an identifier 301 for an item 300, such as when the item is delivered and/or after delivery in order to determine where to place the item (e.g., entire load shipped, one or more components within the load) on the project site. As previously described, the identifier 301 for the item 300 can be captured in any number of ways, including but not limited to capturing an image or scanning a barcode, typed entry, electronic communication, or the like. Captured identifiers 301 may be the same captured information from block 2001. In this case, there is no need for the system 1 to re-capture the same information. However, the identifier captured at block 2701 may be a captured identifier that has previously been shipped to the site.

At block 2702, the system 1 indicates in the model 131 the one or more components associated with the captured identifier. As discussed in more detail above, FIG. 7 shows an example of how captured components may be indicated in the model 131 displayed in the interface on the user computer system 100. As illustrated in block 2703, the system provides the staging information for the one or more components in the model 131 on interface illustrated in the display 114 of the user computer system 100. The staging information may include a location in the model 131 where the component should be located for assembly, the components that can be assembled before installation into the building, the project assets that can be used to assemble the components, the order of installation compared with other components or assembled components, or other like staging information.

In other embodiments of the invention, the system 1 can identify and display staging information in the interface alone or along with shipment information. This functionality is particularly useful for determining whether a particular shipment should be delivered to particular areas on-site without having to unpack the shipment, or unpacking the shipment for staging components within the system 1 to different locations around the site. At block 2801, the system displays shipment information in the interface of the user computer system 100. For example, staging information may be included in the shipment interfaces of FIGS. 6a and 6b. As illustrated by block 2802, the system 1 receives a selection of the shipping information from the display at block 2802. For example, this may include the user selecting one or more shipments as previously discussed herein with respect to block 2302, or capturing an identifier 301 associated with a shipment as previously discussed with respect to block 2101. At block 2803, the system 1 then identifies the one or more selected components associated with the shipment information as previously discussed with respect to block 2303 or 2102. At block 2804, however, the system 1 provides staging information for the one or more components associated with the shipment in the model 131 in the interface of the display 114 of the user computer system 100. In this regard, a user may view staging information for each past, current, or future shipment, allowing users to schedule shipments, prepare the staging areas before shipments arrive, or direct the shipments once the shipments arrive.

It should be understood, that with respect to staging of the items 300 (e.g., shipments, groups of components, and/or specific components) the location of such items may be logged (e.g., recorded and/or stored) for future recall by the users. The logging of the location of the items may be performed automatically and/or manually by a user. For example, while a staged location may be provided in the model, the items may not always end up in a particular staged location. Moreover, in some embodiments a staged location may be relatively large and filled with hundreds of items. As such, the ability to log the location of the items may allow users to quickly identify the location of the items when they need to be recalled in the future. For example, a user may log a location of an item (e.g., a shipment, one or more components, or the like) manually by standing near the item and selecting a log feature within the construction management application for a particular item (e.g., select a shipment, group of components, and/or one or more individual components and store the current location of the user computer system 100 through the use of a location determining device—GPS, or the like—in the user computer system 100). Alternatively, once an item has been delivered to a location on the site an electronic device associated with the item or within a user computer system 100 may automatically log the location of the item. It should be understood that the location determining device may log the position of the user computer system 100 and/or the item within yards, feet, inches, or the like. As such, when a user would like to identify the location of the item (e.g., shipment, group of components, and/or one or more individual components), the user may select the item in the model, or in a list, within the construction management application, and the construction management application will display the location of the item. The location of the item may be displayed in the model and/or the construction management application may indicate the location of the item (e.g., provide the direction and distance) relative to the location of the user computer system 100, such that the user is able to identify the relative location of the item. It should be further understood that in some embodiments the user computer system 100 may also direct the user to the location of the item by illustrating in the model the movement of the user and/or the change in direction and/or distance as the user tries to find the item based on the logged location of the item. In other embodiments, should the item have its own location determining device, the movement of the item may be displayed in the model and/or logged by the construction management application as the item is moved to different locations (e.g., with or without an associated user computer system 100). This logging of the location of the items (e.g., shipments and/or one or more components) allows for the identification of the location of the items quickly, which reduces the time it takes for identifying the items on site, and thus, reduces the time it takes to assemble the building.

At the conclusion of the embodiments discussed herein as described with respected to FIGS. 2a and 2b (i.e., blocks 2101-2804), or during the steps of these process flows, the entity computer system 200 is configured to receive (e.g., receive an upload and/or download) the updated model and any project information from the one or more user computer systems 100 that are used by the customer user and/or the entity user. For example, once a status for one or more components has been changed on a user computer system 100, the system 1 will then transfer the updated status information to the entity computer system 200. In this regard, if a future user seeks to determine the status of the same component or components, the user will be able to access the updated status information regarding the component or components.

In some embodiments of the invention, the model 131 not only illustrates the location of the components, but it may also provide detailed information regarding the connections between the components, the types of fasteners used, the torque values for fasteners, welding instructions, or the like. The connections may be displayed and/or referenced in the model 131 as nodes. The nodes may be selected by the user (e.g., on a touchscreen and/or through a connection list illustrating the nodes) and in response the model 131 may zoom into, or otherwise illustrate, the selected node and/or instructions for making the connection. Detailed connections of the nodes displayed in the 3D model 131 may provide more understandable connection instructions that may otherwise be confusing if read from 2D drawings located on-site. Moreover, the model 131 may further illustrate grid lines and labels providing additional drawing details in the model. Additionally, a user may be able to add notes related to the items 300 in the interfaces, and other users may be able to access such notes. In other embodiments, the user may also add linked documents to items 300 or the model in general. The linked documents may include purchase orders, drawings, specifications, photos of the building, components, connections, or other like documents.

In some embodiments of the invention, the customer users may be able to communicate with the entity users and/or each other (and vice versa) through chats, phone call, messenger features in the application. The communications may be related to changes in the statuses of the components.

Moreover, in some embodiments, the construction management application may create reports (e.g., automatically and/or as requested by the user). The reports may be created and sent between the users. The reports may illustrate the statuses of the items, such as but not limited to the components that were received, assembled, installed, or other component statuses. Moreover, the reports may relate to requested changes in shipping components (e.g., damaged components, additional components needed, or the like). The reports may provide percentages that illustrate statuses as a percent of completion (e.g., completion of shipping, assembling, installing, or the like). The completion reports may include the project as a whole, specific locations of the building, and/or particular phases of construction. The reports may also list the number of components ordered, shipped, assembled, installed, or any other status described herein as fractions (e.g., 2 of 10 components installed, or the like). Moreover, in some embodiments of the invention the construction management application may allow users to set targets (e.g., completion percentage, quantities, or the like based on dates or time periods) for various statuses (e.g., installed, or the like) and track progress against the targets. The reports, and targets therein, illustrate if the project is ahead or behind the schedule and/or targets. The reports may be stored and/or compared over time and recalled as needed, and/or shared directly, through the cloud, or the like.

As discussed generally, staging information may be provided in the interface, such as a part of the model 131 (e.g., one or more staging locations illustrated in the model). For example, the model 131 may indicate the location where the delivery vehicles should delivery the components, where the delivery vehicles should be parked, the location of the components (e.g., illustrate a rendering of the staged components) in the staging areas of the model 131 before installation, the project assets (e.g., cranes, lifts, dozers, bobcats, or the like) and location of the project assets in the model 131.

In some embodiments, the construction management application 121, 221 may communicate with other systems of the customer, entity, and/or third party entities, such as material or component ordering applications, quoting applications, and/or location determining systems for tracking delivery vehicles or other items, locating components on-site, or the like. For example, as described herein, the list may be shipping lists, digital packing lists, bills of lading for the project as a whole, and/or individual phases and/or shipments. Moreover, the lists may include the incoming components yet to be received verses total inventory lists for the project as whole, specific phases, and/or shipments. The statuses of the items (e.g., the one or more components) may be compared verses the lists and/or tracked through the construction management system to improve the construction process. It should be further understood that the construction management system and application may be able to communicate with other programs in order to import information from, and/or export information to, third party product management software.

It should be understood that in some embodiments of the invention, the model 131 may be displayed in the interface of the display 114 of the user computer system 100 according to the surroundings. For example, the model 131 may be orientated based on the actual view of the user viewing the model 131 in the user computer system 100. In other examples, the model 131 may be geo-located in the display 114 to move the illustrated model 131 in the display 114 of the user computer system 100 as the user moves the user computer device 100.

In some embodiments of the invention, it should be understood that the user computer system may be a wearable device (e.g., glasses, watches, helmets, devices attached to clothing, or the like), and as such, the wearable device may operate in the same or similar way as described herein with respect to the user computer systems (e.g., a user's mobile device, such as a phone, or the like). In some embodiments, the wearable devices may be considered a mobile device. In some embodiments, a camera and/or lens associated with the wearable device may operate as the information capture device 113 that is used to capture an image of the identifier, scan the identifier, communicate with the item and/or identifier, or otherwise identify the item.

In still other embodiments of the invention, the model 131 may be displayed in the interface of the display 114 of the user computer system 100 through the use of augmented reality, mixed reality or virtual reality. For example, a camera on the mobile device (e.g., phone, wearable device, or the like) may display the actual surroundings as seen through the camera and overlay the model 131 of the building on the interface illustrated in the display 114 that is providing the surroundings captured by the camera in real-time. As such, the model may be rendered and positioned at full scale as a digital overlay upon the physical real world jobsite that the user may be viewing through the user computer system (e.g., including potentially the through the wearable devices discussed above, or the like). In other embodiments, the virtual reality interface or mixed reality interface may be displayed in the display 114 of the user computer system 100 illustrating a rendering of the surroundings with the model 131 superimposed in the virtual reality or mixed reality environment.

As previously described herein users may share the interfaces on the user's user computer system 100 with one or more other users in real-time. Additionally, the user may share the same information in the augmented reality, virtual reality, and/or mixed reality environments that was previously discussed herein as being shared in the traditional interfaces (e.g., on a touchscreen, or the like). That is, a user may allow another user (e.g., other customer user, other entity user, and/or a guest user) to view what the user is viewing using the user computer system 100 (e.g., in an augmented reality environment, or the like) and/or communicate with each other through a microphone, speakers or like.

As generally described herein, the user may utilize gesture controls to control the actions for the features described with respect to the construction management application through the user computer systems 100. For example, the gestures may include using a touchscreen, making other hand movements that are captured without touching the user computer systems, making eye, head, mouth, arm, finger, or other body gestures in order to control actions within the construction management application. It should be understood that the gestures may be utilized to take any of the actions that can be taken with respect to the features of the construction management application described herein. In particular, the gestures may be utilized to change the status of items (e.g., shipments, one or more components, or the like), such as but not limited the staging, location, assembly, installation, or the like based on using the gestures to change the model and/or lists associated with the model. Embodiments of the invention described herein discuss using a single model for the project. However, it should be understood that multiple models may be used for a single project, and the user computer interface 100 may be able to display two or more models at a time, toggle between two or more models, and/or perform the functionally describe herein across multiple models. In some embodiments of the invention the site may include multiple buildings, and thus, multiple models may be provided for the site. The user may be able to perform the functions described herein for multiple models at a single site.

It will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly state otherwise. Accordingly, the terms "a" and/or "an" shall mean "one or more."

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for aiding on-site building construction, the system comprising:
   one or more memories having computer readable code stored thereon;
   a display; and
   one or more processors operatively coupled to the one or more memories and the display, wherein the one or more processors are configured to execute the computer readable code to:
   receive a model fora building project, wherein the model is an interactive 3D model;
   display the model of the building project on a graphical user interface of the display, wherein the model comprises a plurality of displayed components for constructing the building project, and wherein the plurality of displayed components comprise structural features of a building;
   receive a selection of one or more displayed components within the model or a shipment for the one or more displayed components from a shipping menu, wherein the shipment is assigned at least one of the one or more displayed components within the model, and wherein the selection is received through the graphical user interface on the display of the one or more user computer systems;
   retrieve, in response to the selection, shipping information and status information for the one or more displayed components, wherein the shipping information comprises one or more delivery vehicles for the one or more displayed components, one or more component groups being shipped for the one or more displayed components, or the one or more displayed components being shipped, wherein the status information indicates that the one or more displayed components are manufactured, loaded, or shipped, and wherein the shipping information and the status information is provided by one or more entity systems of an entity providing the one or more components;
   display, in response to receiving the selection, the shipping information and the one or more displayed components highlighted in a color that corresponds to a color coded status indication in the graphical user interface on the display of the one or more user computer systems;
   capture an identifier for the one or more displayed components delivered on-site of the building, wherein the identifier is captured using an information capture device;
   modify, in response to capturing the identifier, the status information of the one or more displayed components in the model as received on-site; and
   modify, in response to capturing the identifier, the color of the one or more displayed components to correspond with the received on-site modified status information and the color coded status indicator.

2. The system of claim 1, wherein the one or more processors are further configured to execute the computer readable code to:
   share the model including the status information in real-time with one or more other user computer systems by linking to the one or more other user computer systems directly or through the one or more entity systems.

3. The system of claim 2, wherein the status information further comprises an assembly prepping status indicating that the one or more components are ready for assembly, are being loaded on equipment, or are being transported for assembly, and wherein sharing the status allows one or more other users to prepare the equipment to move or install the one or more displayed components or prepare the building to receive installation of the one or more displayed components.

4. The system of claim 1, wherein the one or more processors are further configured to execute the computer readable code to:
   determine staging information for the one or more displayed components;
   provide the staging information on the display, wherein the staging information comprises at least one or more staging locations that are indicated in the model on the display for directing delivery of the one or more displayed components to the one or more staging locations on-site at the building; and
   update the status information of the one or more displayed components as being staged.

5. The system of claim 1, further comprising:
   one or more location determining devices operatively coupled to the one or more processors;
   wherein the one or more processors are further configured to execute the computer readable code to:
   receive a selection to log a location of the one or more displayed components;
   receive a selection of the one or more displayed components within the model on the display for logging the location of the one or more displayed components;
   determine a system location of the system based on the one or more location determining devices of the system;
   illustrate an indication of the location logged for the one or more displayed components in the model on the display based on the system location of the system; and
   store the location of the one or more displayed components based on the system location of the system.

6. The system of claim 5, wherein the one or more processors are further configured to execute the computer readable code to:

receive a request to identify the location of the one or more displayed components;
access the location of the one or more displayed components stored;
illustrate within the model on the display the indication of the location logged for the one or more displayed components;
identify a current location of the system; and
illustrate the current location of the system relative to the indication of the location logged for the one or more displayed components in the model on the display.

7. The system of claim 6, wherein the one or more processors are further configured to execute the computer readable code to:
direct a user to the location logged for the one or more components by illustrating a proposed movement of the system from the current location of the system to the indication of the location logged for the one or more displayed components within the model on the display.

8. The system of claim 1, further comprising:
one or more information capture devices operatively coupled to the one or more processors;
wherein the one or more processors are further configured to execute the computer readable code to:
capture surroundings in one or more images using the one or more information capture devices of the system;
display the one or more images of the surroundings on the display of the system; and
superimpose the model over the one or more images of the surrounding on the display of the system.

9. The system of claim 1, further comprising:
one or more information capture devices operatively coupled to the one or more processors;
wherein the one or more processors configured to execute the computer readable code to capture the identifier comprises:
capturing item information from an item using the one or more information capture devices, wherein the item comprises a component of the one or more displayed components, a shipping crate comprising the one or more displayed components, or a delivery vehicle comprising the one or more displayed components.

10. The system of claim 1, wherein receiving the selection of the shipment comprises receiving a selection of the one or more delivery vehicles, the one or more component groups being shipped, or the one or more displayed components being shipped.

11. The system of claim 1, wherein the one or more processors are further configured to execute the computer readable code to:
receive a selection of two or more displayed components within the model on the display;
identify component information for the two or more displayed components selected, wherein the component information comprises at least weights of the two or more displayed components;
determine an aggregated weight of the two or more displayed components based on the component information for the two or more displayed components; and
wherein the aggregated weight of the two or more displayed components is utilized to determine when the two or more displayed components can be pre-assembled adjacent the building project and erected as pre-assembled using a project asset.

12. The system of claim 1, wherein the selection is the selection of the one or more displayed components in the model.

13. The system of claim 1, wherein the selection is the selection of the shipment in the shipment menu.

14. The system of claim 1, wherein the structural features comprise:
primary framing components comprising a support structure, a girder, or a joint;
secondary framing components comprising studs or purlins; and
sheeting comprising decking or wall sheeting.

15. A system for aiding on-site building construction, the system comprising:
one or more memories having computer readable code store thereon;
one or more processors operatively coupled to the one or more memories, wherein the one or more processors are configured to execute the computer readable code to:
receive a request for a model from one or more user computer systems, wherein the model is an interactive 3D model;
provide the model to the one or more user computer systems, wherein the model comprises a plurality of displayed components for constructing a building project, and wherein the plurality of displayed components comprise structural features of a building;
receive a selection of one or more displayed components within the model or a shipment for the one or more components from a shipping menu, wherein the shipment is assigned at least one of the one or more displayed components within the model, and wherein the selection is received through a graphical user interface on a display of the one or more user computer systems;
provide, in response to receiving the selection, shipping information and status information for the one or more components, wherein the shipping information comprises one or more delivery vehicles for the one or more displayed components, one or more component groups being shipped for the one or more displayed components, or the one or more displayed components being shipped, wherein the status information indicates that the one or more displayed components are manufactured, loaded, or shipped, and wherein the shipping information and the status is provided by one or more entity systems of an entity providing the one or more components;
display, in response to receiving the selection, the shipping information and the one or more displayed components highlighted in a color that corresponds to a color coded status indication in the graphical user interface of the display of the one or more user computer systems;
receive an identifier for the one or more displayed components delivered on-site of the building, wherein the identifier is captured using an information capture device of the one or more computer systems;
provide, in response to receiving the identifier captured, modified status information of the one or more displayed components in the model as received on-site; and
provide, in response to receiving the identifier captured, a modified color of the one or more displayed components to correspond with the received on-site modified status information and the color coded status indicator.

16. The system of claim 15, wherein the one or more processors are further configured to:
share the model including the status information in real-time with one or more other user computer systems by linking to the one or more other user computer systems directly or through the one or more entity systems.

17. A computer implemented method for aiding on-site building construction, the method comprising:
receiving, by one or more processors, a model for a building project, wherein the model is an interactive 3D model;
displaying, by the one or more processors, the model of the building project on a graphical user interface of a display operatively coupled to the one or more processors, wherein the model comprises a plurality of displayed components for constructing the building project, and wherein the plurality of displayed components comprise structural features of a building;
receiving, by the one or more processors, a selection of one or more displayed components within the model or a shipment for the one or more displayed components from a shipping menu, wherein the shipment is assigned at least one of the one or more displayed components within the model, and wherein the selection is received through the graphical user interface on the display of the one or more user computer systems;
retrieving in response to the selection, by the one or more processors, shipping information and status information for the one or more displayed components, wherein the shipping information comprises one or more delivery vehicles for the one or more displayed components, one or more component groups being shipped for the one or more displayed components, or the one or more displayed components being shipped, wherein the status information indicates that the one or more displayed components are manufactured, loaded, or shipped, and wherein the shipping information and the status information is provided by one or more entity systems of an entity providing the one or more components;
displaying in response to the selection, by the one or more processors, the shipping information and the one or more displayed components highlighted in a color that corresponds to a color coded status indication in the graphical user interface on the display of the one or more user computer systems;
capturing, by the one or more processors, an identifier for the one or more displayed components delivered on-site of the building, wherein the identifier is captured using an information capture device;
modifying in response to capturing the identifier, by the one or more processors, the status information of the one or more displayed components in the model as received on-site; and
modifying in response to capturing the identifier, by the one or more processors, the color of the one or more displayed components to correspond with the received on-site modified status information and the color coded status indicator.

18. The method of claim 17, further comprising:
sharing, by the one or more processors, the model including the status information with one or more other user computer systems by linking to the one or more other user computer systems directly or through the one or more entity systems in real-time.

19. A computer program product for aiding on-site building construction, the computer program product comprising at least one non-transitory computer-readable medium having computer-readable program code portions embodied therein, the computer-readable program code portions comprising:
an executable portion configured to receive a model fora building project, wherein the model is an interactive 3D model;
an executable portion configured to display the model of the building project on a graphical user interface of a display, wherein the model comprises a plurality of displayed components for constructing the building project, wherein the plurality of displayed components comprise structural features of a building;
an executable portion configured to receive a selection of one or more displayed components within the model or a shipment for the one or more displayed components from a shipping menu, wherein the shipment is assigned at least one of the one or more displayed components within the model, and wherein the selection is received through the graphical user interface on the display of the one or more user computer systems;
an executable portion configured to retrieve, in response to the selection, shipping information and status information for the one or more displayed components, wherein the shipping information comprises one or more delivery vehicles for the one or more displayed components, one or more component groups being shipped for the one or more displayed components, or the one or more displayed components being shipped, wherein the status information indicates that the one or more components are manufactured, loaded, or shipped, and wherein the shipping information and the status information is provided by one or more entity systems of an entity providing the one or more components;
an executable portion configured to display, in response to receiving the selection, the shipping information and the one or more displayed components highlighted in a color that corresponds to a color coded status indication in the graphical user interface on the display of the one or more user computer systems;
an executable portion configured to capture an identifier for the one or more displayed components delivered on-site of the building, wherein the identifier is captured using an information capture device;
an executable portion configured to modify, in response to capturing the identifier, the status information of the one or more displayed components in the model as received on-site; and
an executable portion configured to modify, in response to capturing the identifier, the color of the one or more displayed components to correspond with the received on-site modified status information and the color coded status indicator.

20. The computer program product of claim 19, further comprising:
an executable portion configured to share the model including the status information in real-time with one or more other user computer systems by linking to the one or more other user computer systems directly or through one or more entity systems.

* * * * *